US 11,697,493 B2

(12) United States Patent
Pfaller et al.

(10) Patent No.: US 11,697,493 B2
(45) Date of Patent: Jul. 11, 2023

(54) ROTARY WING AIRCRAFT WITH A SHROUDED TAIL PROPELLER

(71) Applicant: AIRBUS HELICOPTERS DEUTSCHLAND GMBH, Donauworth (DE)

(72) Inventors: Rupert Pfaller, Riemerling (DE); Tobias Ries, Nordendorf (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 17/574,734

(22) Filed: Jan. 13, 2022

(65) Prior Publication Data

US 2023/0024261 A1 Jan. 26, 2023

(30) Foreign Application Priority Data

Jul. 22, 2021 (EP) .................................... 21400016

(51) Int. Cl.
*B64C 27/82* (2006.01)
*B64C 27/06* (2006.01)

(52) U.S. Cl.
CPC .............. *B64C 27/82* (2013.01); *B64C 27/06* (2013.01); *B64C 2027/8236* (2013.01); *B64C 2027/8254* (2013.01); *B64C 2027/8272* (2013.01)

(58) Field of Classification Search
CPC . B64C 27/06; B64C 27/82; B64C 2027/8254; B64C 2027/8272; B64C 2027/8236
See application file for complete search history.

(56) References Cited

U.S. PATENT DOCUMENTS

| 2,929,580 A | 3/1960 | Ciolkosz |
| 3,083,935 A | 4/1963 | Piasecki |
| 3,241,791 A | 3/1966 | Piasecki |
| 3,260,482 A | 7/1966 | Oleg |
| 4,905,932 A * | 3/1990 | Piasecki ................. B64C 27/82 244/17.19 |

(Continued)

FOREIGN PATENT DOCUMENTS

| DE | 1456063 A1 | 11/1968 |
| DE | 1481629 A1 | 3/1969 |

(Continued)

OTHER PUBLICATIONS

European Search Report for European Application No. EP 21400016.8 Completed by the European Patent Office, dated Dec. 14, 2021, 9 pages.

*Primary Examiner* — Tye William Abell
(74) *Attorney, Agent, or Firm* — Brooks Kushman P.C.

(57) ABSTRACT

A rotary wing aircraft that extends along an associated roll axis between a nose region and an aft region. The rotary wing aircraft comprises a main rotor; a propeller that is at least configured to propel the rotary wing aircraft in forward flight condition, wherein the propeller forms a circular propeller disc in rotation around an associated rotation axis; and a shrouded duct that is arranged in the aft region and that forms an inner air duct which accommodates at least partly the propeller, wherein the shrouded duct comprises a yaw and pitch stability enhancement unit for improving yaw and pitch stability of the rotary wing aircraft in the forward flight condition.

20 Claims, 16 Drawing Sheets

(56) References Cited

U.S. PATENT DOCUMENTS

| | | | |
|---|---|---|---|
| 4,928,907 A | 5/1990 | Zuck | |
| 5,131,603 A | 7/1992 | Meyers | |
| 5,277,381 A | 1/1994 | Piasecki | |
| 6,755,374 B1* | 6/2004 | Carson | B64C 27/82 244/17.11 |
| 2010/0324758 A1 | 12/2010 | Piasecki et al. | |
| 2011/0036954 A1* | 2/2011 | Piasecki | |
| 2017/0001722 A1* | 1/2017 | Carpenter | B64C 27/82 |
| 2017/0291689 A1* | 10/2017 | Halcom | B64C 27/20 |
| 2017/0349273 A1* | 12/2017 | Parsons | B64C 27/82 |

FOREIGN PATENT DOCUMENTS

| | | |
|---|---|---|
| DE | 4119388 A1 | 12/1992 |
| EP | 1395489 A2 | 3/2004 |
| EP | 2511177 A1 | 10/2012 |
| EP | 3251952 A1 | 12/2017 |
| WO | 02087967 A2 | 11/2002 |

* cited by examiner

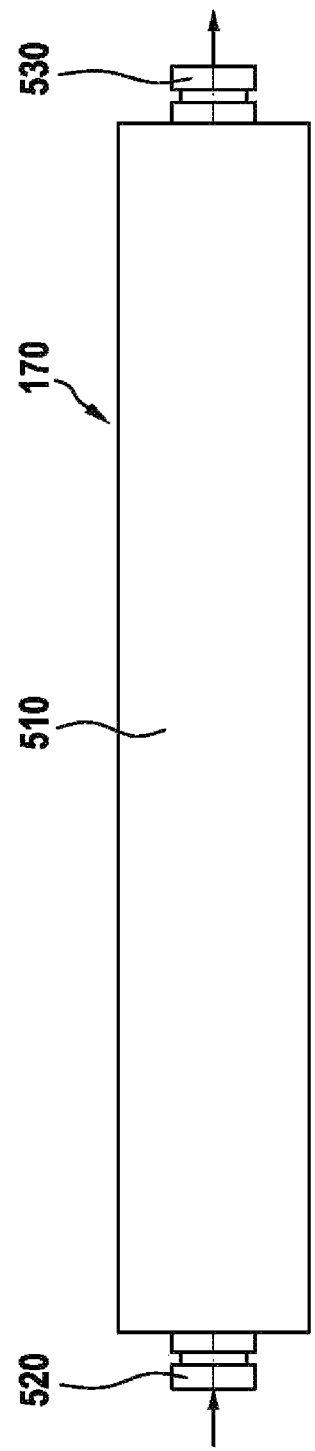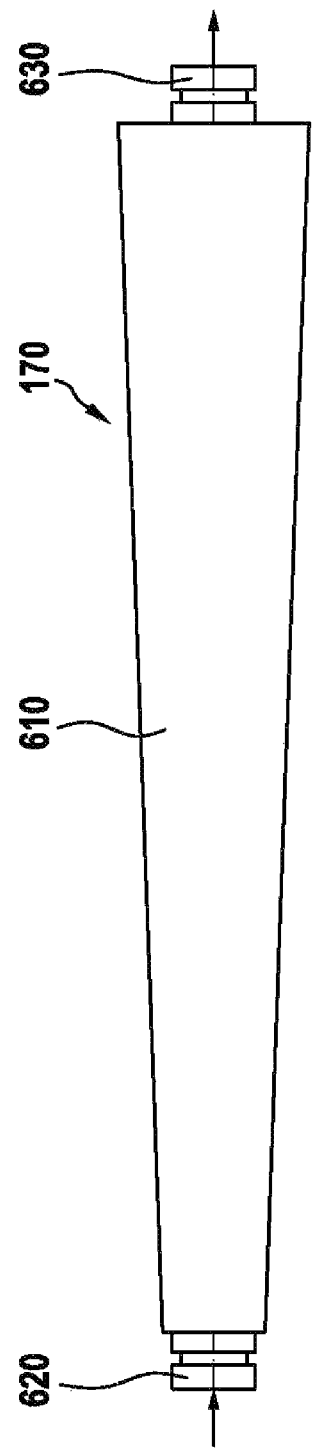

ROTARY WING AIRCRAFT WITH A SHROUDED TAIL PROPELLER

CROSS-REFERENCE TO RELATED APPLICATIONS

This application claims priority to European patent application No. EP 21400016.8 filed on Jul. 22, 2021, the disclosure of which is incorporated in its entirety by reference herein.

TECHNICAL FIELD

The present disclosure relates to a rotary wing aircraft that extends along an associated roll axis between a nose region and an aft region and that comprises a fuselage with a front section and a rear section, wherein the rotary wing aircraft further comprises a main rotor that is at least configured to provide lift in hover condition of the rotary wing aircraft, a propeller that is at least configured to propel the rotary wing aircraft in forward flight condition in a forward flight direction, and a shrouded duct that is arranged in the aft region and that forms an inner air duct which accommodates at least partly the propeller.

BACKGROUND

An example of a rotary wing aircraft with a main rotor and a propeller is a so-called compound helicopter. In such a compound helicopter, the main rotor accomplishes essentially lifting duties, but usually also accomplishes propulsive duties at least at low or medium forward speeds in forward flight condition of the compound helicopter. The propeller, in turn, is mainly provided to off-load the main rotor from its propulsive duties at higher forward speeds in forward flight condition and may enable the compound helicopter to travel with comparatively high forward speeds which would not be reachable by use of the main rotor alone.

However, in operation the main rotor creates torque around the yaw axis of the compound helicopter. This torque must be counteracted by a suitable anti-torque device to guarantee a required yaw stability of the compound helicopter in flight operation.

The document U.S. Pat. No. 4,928,907 describes a compound helicopter with a main rotor, a tail boom, and a tail propeller mounted to an aft region of the tail boom, wherein the tail propeller is used only for forward thrust during an airplane mode of flight and during transition from vertical helicopter flight to forward airplane mode of flight, when the main rotor may be feathered in a no-lift attitude. Required anti-torque balancing forces during hovering mode are developed by differentially controlled aileron forces when respective wings are aligned vertically with main rotor downwash. Furthermore, a vertically moveable horizontal airfoil is provided on the tail boom, with controllable means which can provide anti-torque reaction forces from the main rotor downwash during the hovering mode.

The document EP 1 395 489 A2 describes a compound helicopter with a main rotor, a tail propeller, and a tail boom. The tail boom forms a plenum chamber to which associated linear nozzles are connected. The associated linear nozzles are fixedly coupled to the tail boom and adapted to discharge a sheet of fluid created from pressurized air in the plenum chamber in a direction substantially tangential to an outer surface of the tail boom to divert main rotor downwash and thereby produce a force that counteracts biasing torque created by the main rotor. The pressurized air is provided by a fan or by directing exhaust air from a power plant of the compound helicopter into the plenum chamber. The compound helicopter further comprises a yaw control member which is movably coupled to the tail boom and selectively positionable based on pilot input.

The document EP 2 511 177 A1 describes a compound helicopter with a main rotor, a tail propeller, and a tail boom that is surrounded by a cycloidal rotor. The cycloidal rotor has individual blades which are essentially parallel to the longitudinal axis of the tail boom. In operation, the cycloidal rotor is driven to provide anti-torque that counteracts biasing torque created by the main rotor.

However, the above-described anti-torque devices for compound helicopters with a main rotor and a propeller are generally complex and require elaborate components, such as differentially controlled ailerons or moveable airfoils, additional fans, or cycloidal rotors. These actuatable components increase an overall system complexity and an overall weight of these anti-torque devices.

The document U.S. Pat. No. 3,241,791 describes a compound helicopter with a main rotor and a tail propeller. The tail propeller is mounted to a circular shroud which is attached to the compound helicopter's fuselage. The circular shroud is further provided with a rudder that is pivotally mounted to the circular shroud downstream of the tail propeller. In operation, the tail propeller creates an air stream which is directed through the circular shroud toward the rudder and which may be deflected by the rudder to counteract torque created by the main rotor.

The documents U.S. Pat. No. 3,083,935 A1 and DE 1 456 063 A1 describe a similar compound helicopter with a main rotor and a tail propeller that is accommodated in a circular shroud which is provided with a rudder. Furthermore, a pitch trim tab is provided in addition to the rudder. The pitch trim tab is provided to improve pitch control of the compound helicopter.

The documents U.S. Pat. No. 5,131,603, US 2010/0324758 A1, and US 2011/0036954 A1 describe a similar compound helicopter with a main rotor and a tail propeller that is accommodated in a circular shroud which is provided with a rudder and a pitch trim tab. Furthermore, one or more deployable calotte-shaped sectors are provided in addition to the rudder and the pitch trim tab. The deployable calotte-shaped sectors are deployable from the circular shroud and provided to enable, in deployed state, deviation of tail propeller thrust.

The document U.S. Pat. No. 5,277,381 describes a similar compound helicopter with a main rotor and a tail propeller that is accommodated in a circular shroud which is provided with a rudder and a pitch trim tab. Furthermore, pivotal sidewall flaps are provided in addition to the rudder and the pitch trim tab. The pivotal sidewall flaps are pivotally mounted to the circular shroud and provided to enable, in pivoted state, deviation of tail propeller thrust.

The documents U.S. Pat. No. 3,260,482 and DE 1 481 629 A1 also describe a compound helicopter with a main rotor and a tail propeller that is accommodated in a circular shroud. The circular shroud is provided with a plurality of vertically positioned, direction control vanes and a horizontally positioned pitch trim tab. In operation, the tail propeller creates an air stream which is directed through the circular shroud toward the plurality of vertically positioned, direction control vanes. This air stream may be deflected by the vertically positioned, direction control vanes to counteract torque created by the main rotor.

The document DE 1 456 063 A1 describes a rotary wing aircraft with two horizontally positioned main rotors that are spaced apart from each other in direction of the aircraft's roll axis and accommodated in associated circular shrouds which are provided with pivotable control flaps. The pivotable control flaps are arranged in parallel to the aircraft's roll axis and may be pivoted to counteract torque created by the two horizontally positioned main rotors.

Other aircrafts with circular shrouds that are provided with rudders, flaps, vanes, or tabs and so on are also known from the state of the art. For instance, the document U.S. Pat. No. 2,929,580 describes a propeller aircraft with two propellers that are accommodated in associated circular shrouds which are provided with horizontally arranged flaps. These horizontally arranged flaps are, nevertheless, not used for anti-torque control in contrast to the above described anti-torque devices. EP3251952 and DE4119388 are known.

However, all above-described anti-torque devices with rudders, flaps, or vanes for anti-torque control have their main effect in hover condition of a respective compound helicopter or rotary wing aircraft, but their aerodynamic efficiency in transition and forward flight condition is restricted.

SUMMARY

It is, therefore, an object of the present disclosure to provide a new compound helicopter and, more generally, a new rotary wing aircraft with a main rotor and a tail propeller, which is equipped with an improved anti-torque device with minimum loss of thrust and minimum drag increase due to control inputs and provisions.

This object is solved by a rotary wing aircraft with a main rotor and a tail propeller, said rotary wing aircraft comprising the features of claim 1. More specifically, according to the present disclosure a rotary wing aircraft is provided that extends along an associated roll axis between a nose region and an aft region and that comprises a fuselage with a front section and a rear section. The rotary wing aircraft comprises a main rotor that is at least configured to provide lift in hover condition of the rotary wing aircraft; a propeller that is at least configured to propel the rotary wing aircraft in forward flight condition in a forward flight direction; and a shrouded duct that is arranged in the aft region and that forms an inner air duct which accommodates at least partly the propeller. The rear section extends between the front section and the shrouded duct and comprises an asymmetrical cross-sectional profile in direction of the associated roll axis. The rear section is configured to generate sideward thrust for main rotor anti-torque from main rotor downwash. The propeller comprises a predetermined number of propeller blades which form a circular propeller disc in rotation of the propeller around an associated rotation axis. The shrouded duct comprises a yaw and pitch stability enhancement unit for improving yaw and pitch stability of the rotary wing aircraft in the forward flight condition.

Thus, the inventive rotary wing aircraft may advantageously be controlled at least in transition and forward flight condition with an increased aerodynamic efficiency, in particular with minimum loss of thrust and minimum drag increase due to control inputs and provisions. More specifically, by realizing the yaw and pitch stability enhancement unit with fixed and movable provisions in front and aft of the shrouded duct, gear (pitch) behavior of the rotary wing aircraft may be controlled and its main rotor torque may be balanced in an aerodynamically efficient way. Thus, an increased gear authority may be enabled specifically in forward flight condition.

Preferably, the shrouded duct has a particular form and shaping, e.g., with respect to a non-circular cross section, a variable length, different angles of attack, varying distances of leading/trailing edges to a respective propeller blades' plane, etc. Such a particular form and shaping advantageously enable the shrouded duct to generate sideward thrust for main rotor anti-torque in transition and forward flight condition of the rotary wing aircraft.

Further additional sideward thrust for main rotor anti-torque may be generated from main rotor downwash by means of at least one source of asymmetry. For instance, the at least one source of asymmetry may be located to a side of the rotary wing aircraft that is closest to an approaching rotor blade of the main rotor in the sense of rotation of the main rotor. In other words, if the main rotor rotates in counterclockwise direction, the at least one source of asymmetry is located at the starboard side, i.e., the right-hand side of the fuselage of the rotary wing aircraft, which is preferably formed as a rotary wing aircraft with the main rotor and the propeller.

By way of example, the at least one source of asymmetry may be formed as a protruding edge of the fuselage that may be arranged close to a lower side of the fuselage. Such a protruding edge may be formed sufficiently large in order to be usable as a step. Furthermore, it may e.g., be integrated into an aerodynamically shaped skid landing gear. Alternatively, such a protruding edge may be built by a cover of a retractable nose landing gear. In this case, an aerodynamic performance of the rotary wing aircraft in fast forward flight will not be affected by the protruding edge, as it will be retracted into the fuselage together with the retractable nose landing gear such that the overall configuration is aerodynamically clean again. In fact, generation of respective anti-torque using the protruding edge preferably mainly occurs in hover condition and slow forward flight.

The at least one source of asymmetry may further include an elongation, i.e., a convex projection on top of the fuselage of the rotary wing aircraft, i.e., at an upper side of the fuselage. A suitable elongation may e.g., be obtained by an appropriate shaping of an upper cowling that covers an upper deck of the rotary wing aircraft. A highest point of the upper cowling may be shifted to an opposite side of the fuselage such that there is a smooth transition, at least with tangent constancy in the upper area of the cross section.

The sideward thrust for main rotor anti-torque that may be generated by the shrouded duct and/or the at least one source of asymmetry is advantageously increased by sideward thrust from main rotor downwash that is generated by means of the rear section of the fuselage of the rotary wing aircraft. More particularly, the rear section preferably generates the main part of sideward thrust from main rotor downwash. Therefore, the rear section of the fuselage of the rotary wing aircraft may exhibit a shape that is similar to a profile of a so-called high lift airfoil such that comparatively high sideward thrust may already be generated at comparatively low downwash air speed. Preferably, at least the main part of the rear section of the fuselage is asymmetrically located to a side of the rotary wing aircraft that is farther away from an approaching rotor blade of the main rotor in the sense of rotation of the main rotor. In other words, if the main rotor rotates in counterclockwise direction, the main part of the rear section of the fuselage is located at the starboard side of the rotary wing aircraft.

Preferably, a vertical cut through the rear section of the fuselage at a position that is close to the aft region of the rotary wing aircraft resembles to a high lift airfoil. This high lift airfoil is orientated at that position preferably at least approximately in vertical direction providing "lift", i.e., sideward thrust in the same direction in which the main rotor is rotating. In other words, if the main rotor rotates in counterclockwise direction, the sideward thrust likewise points into this direction.

Thus, less power is needed in hover condition as generation of downward drag in response to main rotor downwash is reduced due to a transformation of the main rotor downwash into sideward thrust, compared to the downward drag that is created by a conventional tail boom in response to main rotor downwash. Consequently, a gain of lifting capacity and fuel savings may be realized.

Advantageously, a transition in the region of the main rotor, preferably in a region between the main rotor and the rear section of the fuselage, from a cross-sectional profile of the rotary wing aircraft's fuselage, which may be symmetrical similar to a cross-sectional profile of a conventional helicopter, to the high lift airfoil-shaped cross-sectional profile of the rear section of the fuselage may be embodied as a smooth recess. The latter is preferably shaped in order to avoid airflow separation.

In an illustrative realization, the rear section is provided in the aft region with the shrouded duct, to which the propeller is rotatably mounted. An underlying transition of the rear section of the fuselage to the shrouded duct is preferably smooth, such that the rear section of the fuselage has at least approximately a shaping that corresponds to one quarter of the shrouded duct.

Furthermore, at least one wing-type aerodynamic device, which is also referred to as the "support wing" hereinafter, may be associated with the rear section of the fuselage for additional generation of sideward thrust for main rotor anti-torque from main rotor downwash. In operation of the rotary wing aircraft, a certain amount of main rotor downwash is present mainly in hover condition. Therefore, "lift" in horizontal direction, i.e., sideward thrust, may advantageously be generated simultaneously by the rear section of the fuselage, the associated support wing, as well as the front section and the shrouded duct, from the main rotor downwash in order to counteract the torque created by the main rotor in the hover condition.

Preferably, the support wing is mainly oriented vertically. More specifically, the support wing may connect the rotary wing aircraft's upper deck to the shrouded duct, e.g., from slightly behind of the main rotor to the shrouded duct. Advantageously, the support wing also exhibits a shape that is similar to a profile of a high lift airfoil. Preferably, the support wing has its greatest width at an area located between 60% of the length of the main rotor's rotor blades and an outer end of the rotor blades.

Advantageously, the support wing and the rear section of the fuselage support the shrouded duct on both sides of the rotary wing aircraft, as there is no center part of the rear section of the fuselage, compared to a conventional tail boom. Preferably, a tail propeller drive shaft is arranged between the support wing and the rear section of the fuselage. This tail propeller drive shaft may also generate sideward thrust via the so-called Magnus effect, which occurs if a cylinder or cone is rotated in an airflow that is oriented perpendicular to its rotation axis.

The tail propeller drive shaft is preferably rotatably mounted to the shrouded duct, preferentially via a bearing that is supported by a predetermined number of provided stator profiles, such as e.g., three stator profiles. Preferably the stator profiles are mounted to the shrouded duct close to a respective location of the support wing and upper and lower edges of the rear section of the fuselage, where it is connected to the shrouded duct.

Alternatively, instead of providing a tail propeller drive shaft, the tail propeller may be powered independent of the main rotor, e.g., by means of a separate engine. This separate engine may be of a different type than a respective main engine that powers the main rotor such that engine hybridization is enabled with high redundancy, as the rotary wing aircraft may be operated in forward flight with each one of the engines independent of the other one.

According to some aspects, the yaw and pitch stability enhancement unit comprises a rudder that is arranged in the forward flight direction downstream of the circular propeller disc, the rudder comprising an elongated rudder body that is twisted around a length axis of the elongated rudder body.

According to some aspects, the elongated rudder body comprises a leading edge that is provided with a plurality of spaced tubercles.

According to some aspects, the elongated rudder body comprises an airfoil-shaped profile with a straight centerline that is rotated around the length axis of the elongated rudder body between both axial ends of the elongated rudder body, or with a cambered centerline that comprises a varying camber between both axial ends of the elongated rudder body.

According to some aspects, the rudder is rotatably mounted to the shrouded duct, or provided with one or more rotatable flaps.

According to some aspects, the yaw and pitch stability enhancement unit comprises at least one strut that is arranged in the forward flight direction downstream of the circular propeller disc, the at least one strut comprising an elongated strut body that is twisted around a length axis of the elongated strut body.

According to some aspects, the elongated strut body comprises a leading edge that is provided with a plurality of spaced tubercles.

According to some aspects, the elongated strut body comprises an airfoil-shaped profile with a straight centerline that is rotated around the length axis of the elongated strut body between both axial ends of the elongated strut body, or with a cambered centerline that comprises a varying camber between both axial ends of the elongated strut body.

According to some aspects, the yaw and pitch stability enhancement unit comprises at least one calotte-shaped Fowler-type flap.

According to some aspects, the shrouded duct comprises a ring-shaped duct body, wherein the at least one calotte-shaped Fowler-type flap is at least partly retractable into the ring-shaped duct body.

According to some aspects, the at least one calotte-shaped Fowler-type flap is arranged on a trailing edge of the shrouded duct.

According to some aspects, the at least one calotte-shaped Fowler-type flap forms, in a neutral position, at least partly the trailing edge of the shrouded duct.

According to some aspects, the yaw and pitch stability enhancement unit comprises a plurality of airfoil-shaped aerodynamic devices, in particular high lift airfoils, arranged at least approximately in parallel to the associated roll axis or angled in a range of +/−10 degrees relative to roll axis (R), and forming a transition from the rear section to a leading edge of the shrouded duct.

According to some aspects, the shrouded duct comprises a leading edge that is provided with a plurality of spaced tubercles.

According to some aspects, the rear section comprises at least one airfoil-shaped aerodynamic device that extends from the front section to the aft region, wherein the at least one airfoil-shaped aerodynamic device is configured to generate sideward thrust for main rotor anti-torque from main rotor downwash.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

FIG. 5 shows a side view of an illustrative propeller drive shaft of the rotary wing aircraft of FIG. 1 to FIG. 4 according to an aspect, FIG. 6 shows a side view of an illustrative propeller drive shaft of the rotary wing aircraft of FIG. 1 to FIG. 4 according to another aspect.

DETAILED DESCRIPTION

Figure 1:
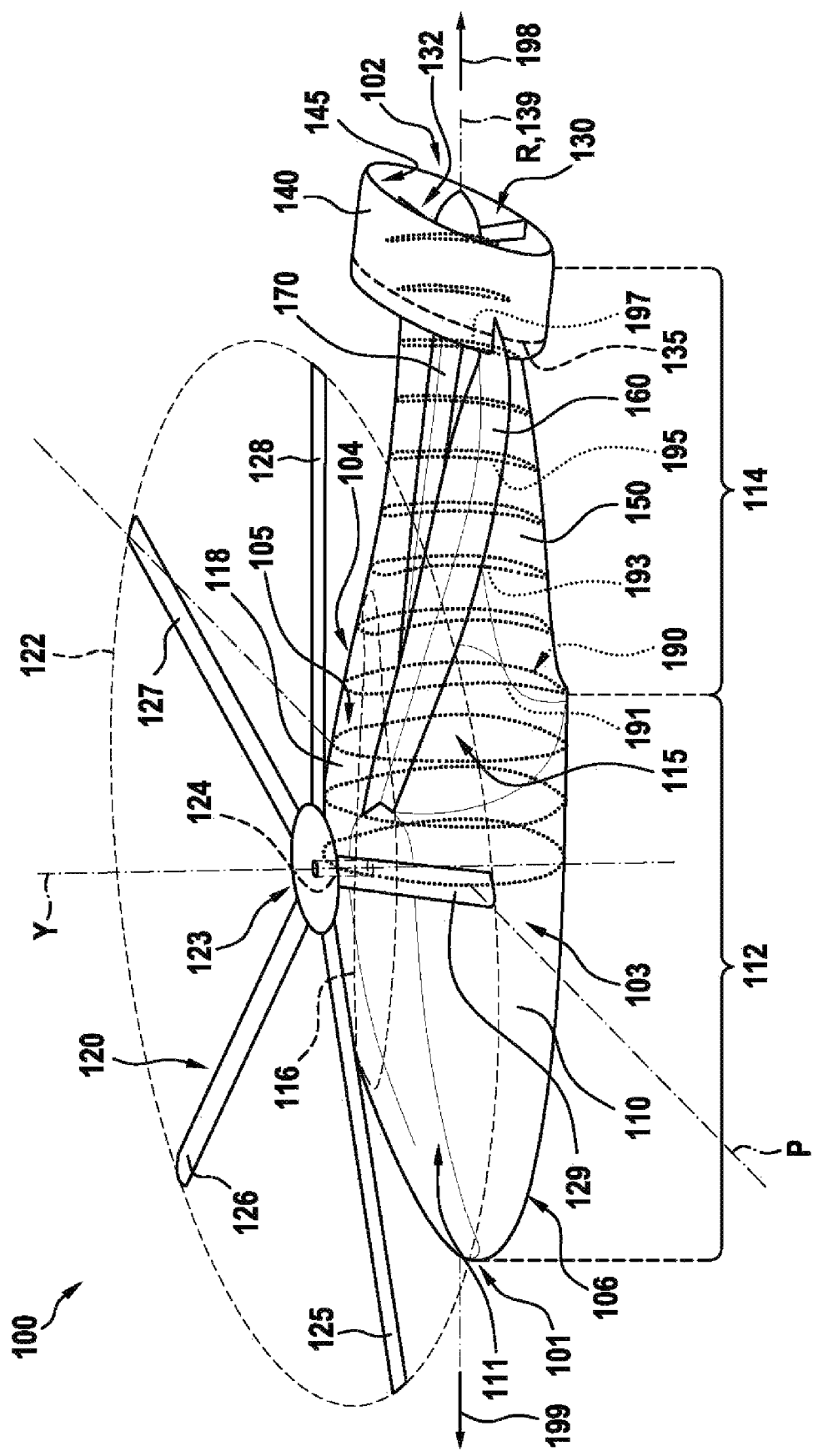
FIG. 1 shows a perspective view of a rotary wing aircraft with a shrouded duct according to the present disclosure.

FIG. 1 shows an illustrative rotary wing aircraft 100 with a fuselage 110 and a main rotor 120. By way of example, the rotary wing aircraft 100 is shown with three mutually orthogonal axes P, R, and Y. The axis P represents a transversal axis that corresponds to the pitch axis inherent to the rotary wing aircraft 100, the axis R represents a longitudinal axis that corresponds to the roll axis inherent to the rotary wing aircraft 100, and the axis Y represents a vertical axis that corresponds to the yaw axis inherent to the rotary wing aircraft 100.

By way of example, the rotary wing aircraft 100 is illustrated in forward flight condition. Thus, only components that are required in the forward flight condition are illustrated in more detail, while illustration of other components is omitted, for simplicity and clarity of the drawing. For instance, neither the fuselage 110 is illustrated in greater detail for showing e.g., respective doors and windows, nor a possible landing gear, which may be a wheel-type landing gear or a skid-type landing gear mounted to the fuselage 110, is shown, and so on.

Illustratively, the fuselage 110 extends along the roll axis R from a nose region 101 to an aft region 102 of the rotary wing aircraft 100. The fuselage 110 comprises a front section 112 and a rear section 114. Illustratively, the front section 112 comprises a port side wall 103 and a starboard side wall 104. Preferably, the rear section 114 extends in prolongation to one of the port side wall 103 or the starboard side wall 104.

More specifically, the rear section 114 preferably extends in prolongation to a side of the fuselage 110 that is farther away from an approaching rotor blade of the main rotor 120 in the sense of rotation of the main rotor 120. Assuming that the main rotor 120 rotates in counterclockwise direction, the rear section 114 of the fuselage 110 would be located at the starboard side of the rotary wing aircraft 100 and, thus, be arranged in prolongation to the starboard side wall 104 as illustrated.

By way of example, the front section 112 merges into the rear section 114 at an associated transition or recess area 115. In other words, starting at the nose region 101 of the fuselage 110 and travelling along the roll axis R, the fuselage 110 has the front section 112 that merges at the transition or recess area 115 into the rear section 114 that, in turn, terminates in the aft region 102.

The front section 112 preferably forms a cabin 111 for passengers and/or cargo. The cabin 111 and, more generally, the fuselage 110 illustratively extends in direction of the yaw axis Y from a lower side 106 to an upper limit 116 that separates the cabin 111 from an upper deck 105. The upper deck 105 is preferably covered by a cowling 118. By way of example, the cowling 118 may cover one or more suitable engines and a main gear box that rotates the main rotor 120 in operation. Accordingly, the main rotor 120 is rotatably mounted at the front section 112 of the fuselage 110.

Preferably, the main rotor 120 is at least configured to provide lift in hover condition of the rotary wing aircraft 100. By way of example, the main rotor 120 forms a single rotor plane 122 and is adapted to provide lift and forward or backward thrust during operation. Illustratively, the main rotor 120 is embodied as a multi-blade main rotor with a plurality of rotor blades 125, 126, 127, 128, 129 which are coupled at an associated rotor head 123 to a rotor mast 124, which rotates in operation of the rotary wing aircraft 100 around an associated rotor axis.

According to one aspect, the rotary wing aircraft 100 is embodied as a compound helicopter with a propeller 130 that is at least configured to propel the rotary wing aircraft 100 in forward flight condition in a forward flight direction 199. Accordingly, the rotary wing aircraft 100 is referred to hereinafter as the "compound helicopter 100", for simplicity and clarity.

Illustratively, the propeller 130 comprises a predetermined number of propeller blades 132 which form a circular propeller disc 135 in rotation of the propeller 130 around an associated rotation axis 139. More specifically, the propeller blades 132 rotate in operation around the rotation axis 139 in order to generate an airstream in a direction 198, which is hereinafter also referred to as the "propulsion airstream 198", for simplicity and brevity. The propulsion airstream 198 is preferably at least generated to propel the compound helicopter 100 in the forward flight condition.

The propeller 130 and the main rotor 120 may preferably be driven completely independent from each other. In particular, different types of engines may be used to drive the propeller 130 and the main rotor 120, such as e.g., an air breathing propulsion engine for the main rotor 120 and an electric motor for the propeller 130.

Preferably, the propeller 130 is rotatably mounted to a shrouded duct 140 at the rear section 114 of the fuselage 110 in the aft region 102 of the compound helicopter 100. More specifically, the shrouded duct 140 is arranged in the aft region 102 and preferably forms an inner air duct 145 which accommodates at least partly the propeller 130. Accordingly, the propeller 130 forms a tail propeller and, more particularly, preferably a pusher propeller. The propeller 130 may be mounted by any suitable means to the shrouded duct 140, such as e.g., suitable stator profiles or struts. The shrouded duct 140 may be formed to generate sideward thrust for main rotor anti-torque at least in the forward flight condition.

According to one aspect, the shrouded duct 140 comprises a yaw and pitch stability enhancement unit, as described below at FIG. 8A to FIG. 23. The yaw and pitch stability enhancement unit is preferably provided for improving yaw and pitch stability of the compound helicopter 100 in the forward flight condition.

Illustratively, the rear section 114 of the fuselage 110 extends between the front section 112 of the fuselage 110 and the shrouded duct 140. The rear section 114 preferably comprises an asymmetrical cross-sectional profile 190 in direction of the roll axis R of the compound helicopter 100. According to one aspect, the rear section 114 is configured to generate sideward thrust for main rotor anti-torque from main rotor downwash. By way of example, the asymmetrical cross-sectional profile 190 is at least approximately C-shaped, as illustrated with a series of cross-sectional profiles 191, 193, 195, 197.

In addition, or alternatively, the rear section 114 may comprise at least one airfoil-shaped aerodynamic device 150 that extends from the front section 112 to the aft region 102 and, more particularly, to the shrouded duct 140. By way of example, only one airfoil-shaped aerodynamic device 150 is shown. This airfoil-shaped aerodynamic device 150 is illustratively arranged in prolongation to the starboard side wall 104.

In an illustrative realization, the airfoil-shaped aerodynamic device 150 is formed as, or by, a wing. This wing is, however, not arranged transversally to the roll axis R, but instead at least approximately in parallel to the roll axis R.

The airfoil-shaped aerodynamic device 150 may form the rear section 114, at least partly. More particularly, the airfoil-shaped aerodynamic device 150 may be configured to generate sideward thrust for main rotor anti-torque from main rotor downwash.

The rear section 114 may further comprise at least one wing-type aerodynamic device 160 that extends between the front section 112 and the shrouded duct 140. By way of example, only one wing-type aerodynamic device 160 is shown. Illustratively, the wing-type aerodynamic device 160 is at least approximately arranged in prolongation to the port side wall 103.

Preferably, the wing-type aerodynamic device 160 is mounted to the shrouded duct 140 and to the upper deck 105 of the compound helicopter 100. Illustratively, the wing-type aerodynamic device 160 and the airfoil-shaped aerodynamic device 150 are connected to opposite sides of the shrouded duct 140. The wing-type aerodynamic device 160 may also be configured to generate sideward thrust for main rotor anti-torque from main rotor downwash of the compound helicopter 100.

Illustratively, the compound helicopter 100 further comprises an uncovered propeller drive shaft 170, in particular a cylinder shaft as described below at FIG. 5 or a conical shaft as described below at FIG. 6, that is configured to create a Magnus effect upon rotation in main rotor downwash. The uncovered propeller drive shaft 170, and likewise the shrouded duct 140, may be inclined and may have an offset to the roll axis R of the compound helicopter 100 seen from above. Preferably, the uncovered propeller drive shaft 170 is configured to drive the propeller 130 in operation and, illustratively, extends coupling- and bearing-free between the front section 112 of the fuselage 110 and the propeller 130, i.e., without intermediate coupling(s) and bearing(s).

The front section 112, in turn, may comprise one or more sources of asymmetry, as described below at FIG. 4. This source of asymmetry may also be configured to generate sideward thrust for main rotor anti-torque from main rotor downwash of the compound helicopter 100.

Figure 2:
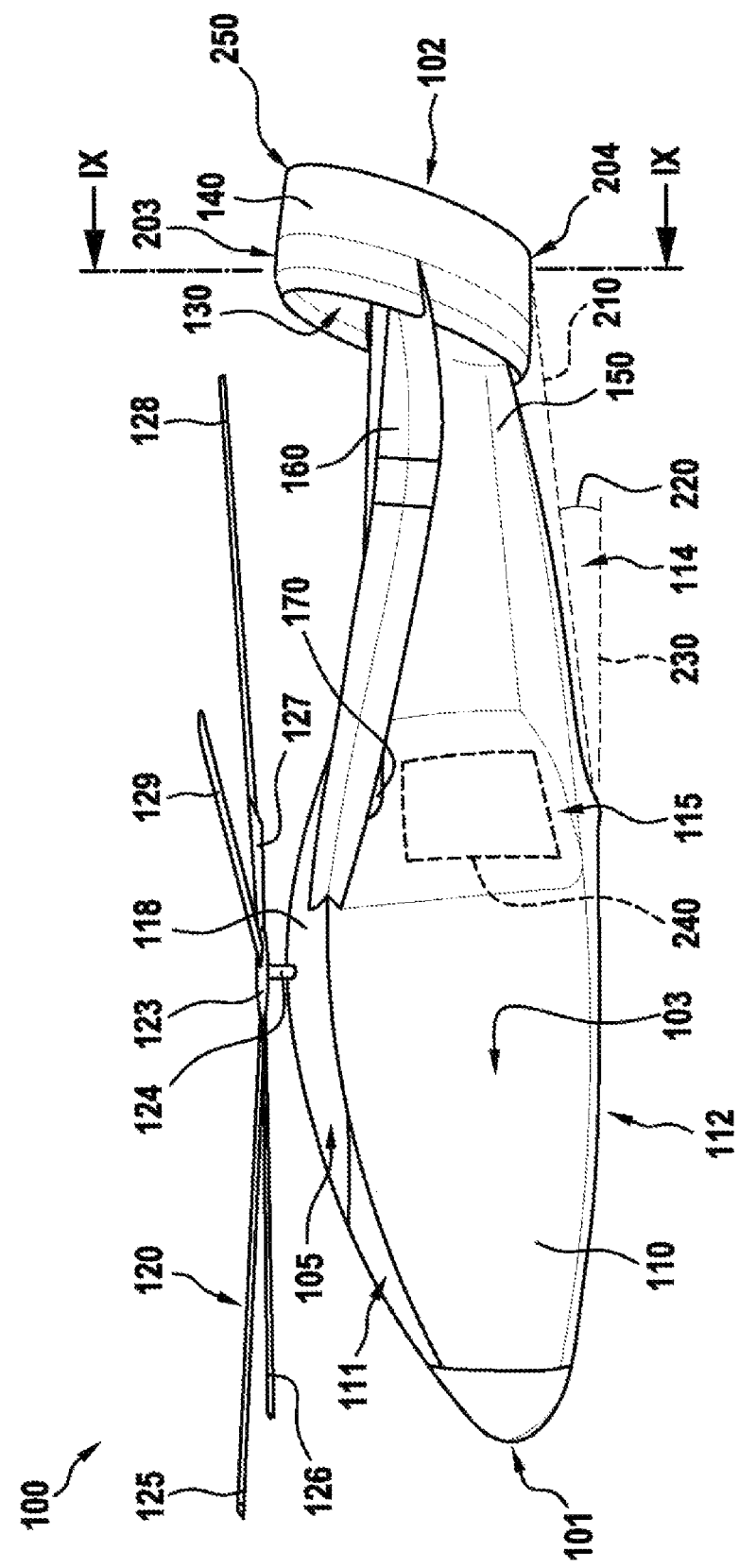
FIG. 2 shows a side view of the rotary wing aircraft of FIG. 1.

FIG. 2 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the propeller 130 is rotatably mounted to the shrouded duct 140 and driven by the uncovered propeller drive shaft 170, and the wing-type aerodynamic device 160 connects the upper deck 105 to the shrouded duct 140.

According to one aspect, the shrouded duct 140 forms a swept back structure 250 and, illustratively, comprises an upper side 203 and a lower side 204. This swept back structure 250 is preferably provided to adapt main rotor downwash at the shrouded duct 140 to a preferred behavior of the compound helicopter 100 during transition from hover condition to forward flight.

Illustratively, a bottom line 210 of the rear section 114 of the fuselage 110 is shown, which extends along the rear section 114 up to the lower side 204 of the shrouded duct 140. This bottom line 210 is preferably angled by a predetermined inclination angle 220 relative to a horizontal reference plane 230. By way of example, the predetermined inclination angle 220 is a positive (dihedral) angle that may be selected dependent on a required sideward thrust that is to be generated by the rear section 114 of the fuselage 110 in operation.

It should, nevertheless, be noted that the dihedral angle is only shown and described by way of example and not for restricting the present disclosure accordingly. Moreover, it should be noted that instead of selecting the illustrative dihedral angle e.g., a negative (anhedral) angle may likewise be selected for the predetermined inclination angle 220. In this case, an increase of up to 30% of generated sideward thrust may be obtained, resulting in a possibly achievable increase of more than 40% of a respectively generated counteracting moment.

Furthermore, according to one aspect a rear door 240 and/or additional equipment, such as e.g., a winch, may be arranged in the recess area 115. The rear door 240 may e.g., be a sliding or dual cantilever door. By way of example, the rear door 240 may be slidable into the fuselage 110, i.e., toward the cabin 111. Thus, in forward flight with opened door, there is no additional drag generated by the rear door 240.

Preferably, this rear door 240 is accessible from a rear side of the compound helicopter 100, i.e., coming from the rear section 114. Thus, the compound helicopter's cabin 111 may be loaded from the rear side. Advantageously, by positioning the rear door 240 in the recess area 115, penalties to the overall aerodynamic performance of the compound helicopter 100 due to the rear door 240 may be avoided.

Figure 3:
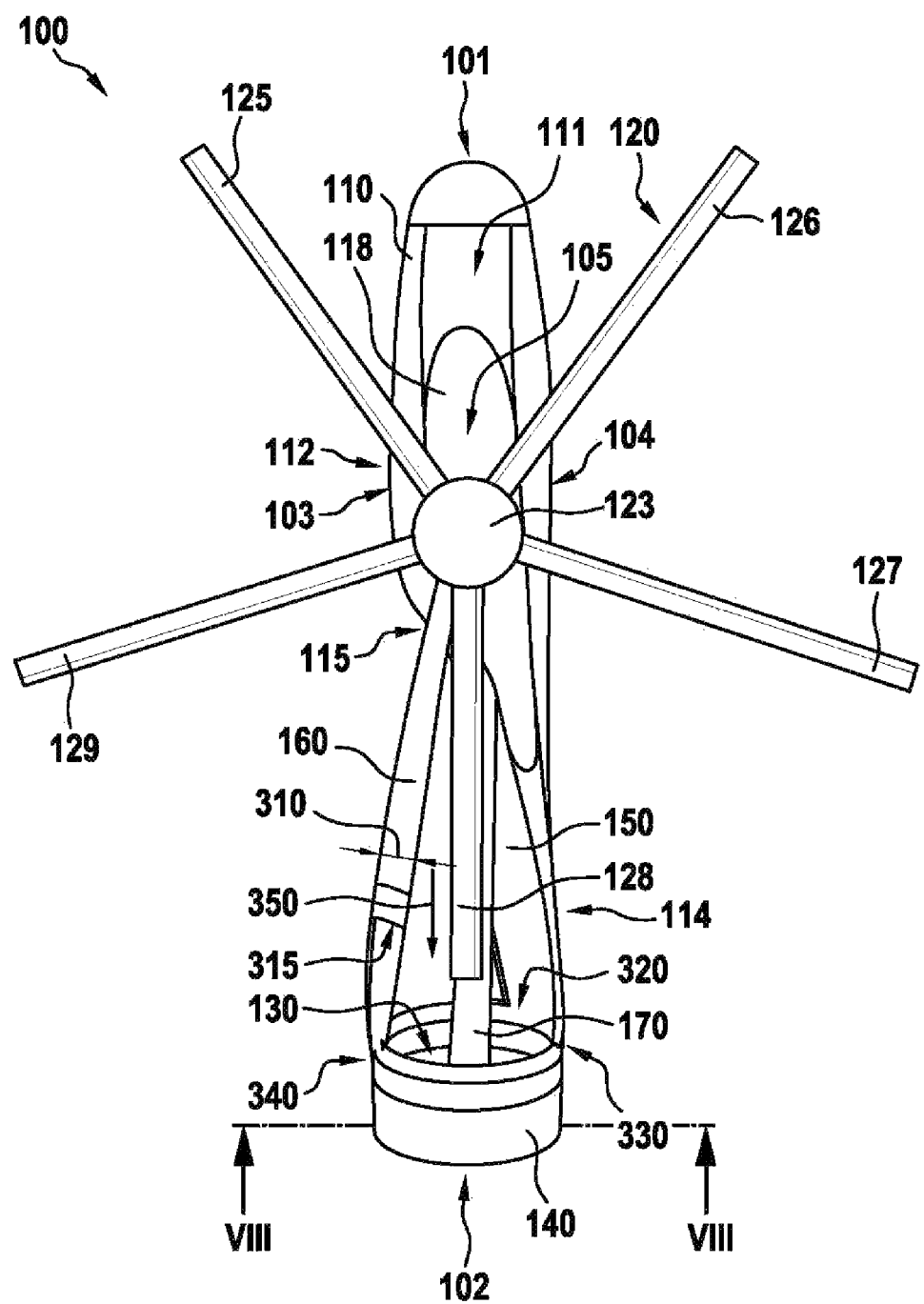
FIG. 3 shows a top view of the rotary wing aircraft of FIG. 1 and FIG. 2.

FIG. 3 shows the compound helicopter 100 of FIG. 1 and FIG. 2 with the fuselage 110, the main rotor 120, the propeller 130, the shrouded duct 140, and the uncovered propeller drive shaft 170. According to FIG. 1 and FIG. 2, the fuselage 110 comprises the front section 112 that merges at the recess area 115 into the rear section 114, the rear section 114 comprises the airfoil-shaped aerodynamic device 150 and the wing-type aerodynamic device 160, the main rotor 120 comprises the rotor blades 125, 126, 127, 128, 129 and the rotor head 123 which is arranged in the front section 112 of the fuselage 110, the propeller 130 is rotatably mounted to the shrouded duct 140 and driven by the uncovered propeller drive shaft 170, and the wing-type aerodynamic device 160 connects the upper deck 105 to the shrouded duct 140.

More particularly, FIG. 3 clarifies the arrangement of the main rotor 120 and its rotor head 123 in the front section 112 of the fuselage 110, as well as the merging of the front section 112 along the recess area 115 into the rear section 114 of the fuselage 110 by redirecting, i.e., deflecting the port side wall 103 of the compound helicopter 100 in the recess area 115 toward the starboard side wall 104. Furthermore, the connection of the airfoil-shaped aerodynamic device 150 and the wing-type aerodynamic device 160 to almost diametrically opposed sides 330, 340 of the shrouded duct 140, which correspond to the starboard side wall 104 side and the port side wall 103 side, is also clarified. Preferably, at least the connection of the airfoil-shaped aerodynamic device 150 to the shrouded duct 140 is formed as a smooth transition 320, preferentially over at least 25% of an overall perimeter of the shrouded duct 140.

By way of example, the wing-type aerodynamic device 160 has a width 310 that increases from the upper deck 105 over a predetermined length of the wing-type aerodynamic device 160. More specifically, the width 310 illustratively starts to increase at the upper deck 105 and increases in direction of the shrouded duct 140.

The width 310 may increase such that a maximum width value is reached at an area located between 60% of the length of the rotor blades 125, 126, 127, 128, 129 and their outer ends. Preferably, the width 310 increases over at least 75% of the length of the wing-type aerodynamic device 160. Illustratively, 75% of the length of the wing-type aerodynamic device 160 is reached at a location 315.

Figure 4:
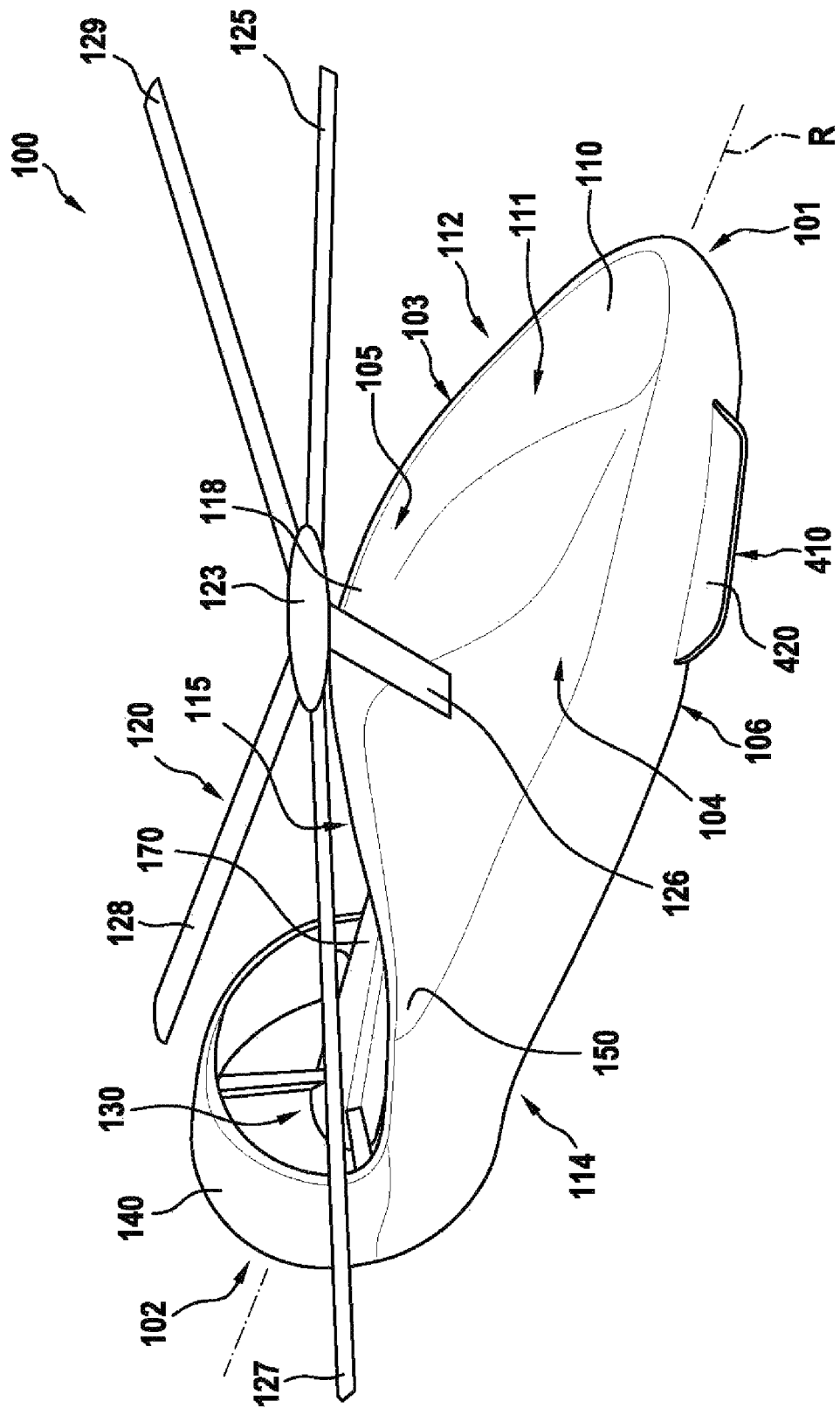
FIG. 4 shows another perspective view of the rotary wing aircraft of FIG. 1 to FIG. 3, with an illustrative source of asymmetry.

FIG. 4 shows the compound helicopter 100 of FIG. 1 to FIG. 3 with the fuselage 110, the main rotor 120, the propeller 130, the shrouded duct 140, and the uncovered propeller drive shaft 170. According to FIG. 1 to FIG. 3, the fuselage 110 comprises the front section 112 that merges at the recess area 115 into the rear section 114, the rear section 114 comprises the airfoil-shaped aerodynamic device 150, and the propeller 130 is rotatably mounted to the shrouded duct 140 and driven by the uncovered propeller drive shaft 170. However, illustration of the wing-type aerodynamic device 160 is omitted for simplicity and clarity of the drawing.

More particularly, FIG. 4 clarifies the connection of the airfoil-shaped aerodynamic device 150 to the shrouded duct 140. Furthermore, the merging of the front section 112 along the recess area 115 into the rear section 114 of the fuselage 110 by redirecting, i.e., deflecting the port side wall 103 of the compound helicopter 100 in the recess area 115 toward the starboard side wall 104 is also further clarified.

By way of example, at least one source of asymmetry 410 is connected to the front section 112, preferably close to the lower side 106 of the fuselage 110, such that the front section 112 comprises at least in sections an asymmetrical cross-sectional profile in direction of the associated roll axis R of FIG. 1. The at least one source of asymmetry 410 is preferably configured to generate sideward thrust for main rotor anti-torque from main rotor downwash.

The at least one source of asymmetry 410 may be formed as an integral part of the fuselage 110. Illustratively, the at least one source of asymmetry 410 is embodied as an integrally formed protruding edge of the fuselage 110. Alternatively, the at least one source of asymmetry 410 may be pivotable and/or retractable, e.g., retractable into the fuselage 110.

By way of example, the protruding edge is formed as a plate-shaped protrusion 420 of the fuselage 110. The plate-shaped protrusion 420 is illustratively integrally formed with the fuselage 110. The plate-shaped protrusion 420 may e.g., form an accessible step, for instance a step that is suitable to support passenger access into the cabin 111 of the compound helicopter 100.

FIG. 5 shows the uncovered propeller drive shaft 170 of FIG. 1 to FIG. 4 which, in an illustrative realization, comprises a big diameter cylinder shaft 510. This big diameter cylinder shaft 510 has preferably a diameter comprised in a range from 5 to 10 times the diameter of a conventional tail rotor drive shaft. Preferably, the big diameter cylinder shaft 510 enables creation of the so-called Magnus effect for generating additional sideward thrust in operation from main rotor downwash of the main rotor 120 of the compound helicopter 100 of FIG. 1 to FIG. 4.

As described above at FIG. 1, the uncovered propeller drive shaft 170 and, thus, the big diameter cylinder shaft 510 preferably extends coupling- and bearing-free between the front section 112 of the fuselage 110 and the propeller 130. For purposes of illustration, the big diameter cylinder shaft 510 is, therefore, shown with two suitable bearings 520, 530 at its axial ends, which are provided to rotatably support the big diameter cylinder shaft 510.

In order to enable the coupling- and bearing-free extension of the big diameter cylinder shaft 510 between the front section 112 of the fuselage 110 and the propeller 130, the big diameter cylinder shaft 510 must be sufficiently stiff for a reliable and secure functioning. This may be achieved by forming the big diameter cylinder shaft 510 using carbon composites, especially high modulus fiber.

FIG. 6 shows the uncovered propeller drive shaft 170 of FIG. 1 to FIG. 4 which, in another illustrative realization, comprises a big diameter conical shaft 610. This big diameter conical shaft 610 has preferably a largest diameter comprised in a range from 5 to 10 times the diameter of a conventional tail rotor drive shaft. Preferably, the big diameter conical shaft 610 also enables creation of the so-called Magnus effect for generating additional sideward thrust in operation from main rotor downwash of the main rotor 120 of the compound helicopter 100 of FIG. 1 to FIG. 4.

As described above at FIG. 1, the uncovered propeller drive shaft 170 and, thus, the big diameter conical shaft 610 preferably extends coupling- and bearing-free between the front section 112 of the fuselage 110 and the propeller 130. For purposes of illustration, the big diameter conical shaft 610 is, therefore, shown with two suitable bearings 620, 630 at its axial ends, which are provided to rotatably support the big diameter conical shaft 610. Preferably, the bearing 630 supports the big diameter conical shaft 610 at the propeller 130 of FIG. 1.

In order to enable the coupling- and bearing-free extension of the big diameter conical shaft 610 between the front section 112 of the fuselage 110 and the propeller 130, the big diameter conical shaft 610 must be sufficiently stiff for a reliable and secure functioning. This may be achieved by forming the big diameter conical shaft 610 using carbon composites, especially high modulus fiber.

Figure 7:
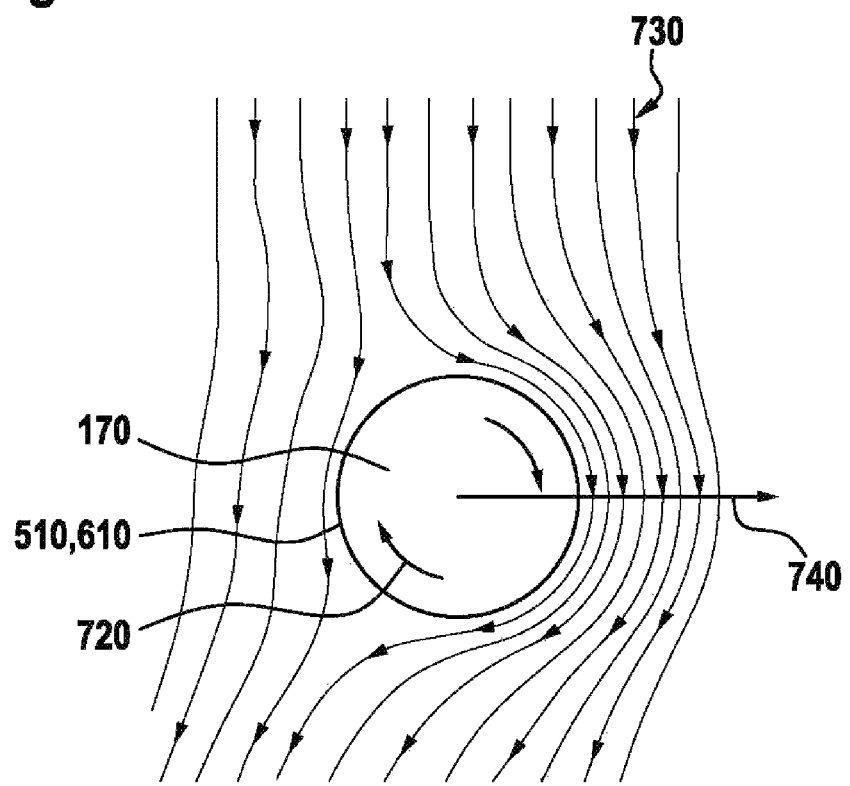
FIG. 7 shows a functional diagram of the propeller drive shaft of FIG. 5 and FIG. 6.

FIG. 7 shows the uncovered propeller drive shaft 170 of FIG. 1 to FIG. 4, which either comprises the big diameter cylinder shaft 510 of FIG. 5 or the big diameter conical shaft 610 of FIG. 6. In an illustrative operation of the main rotor 120 of the compound helicopter 100 of FIG. 1 to FIG. 4, the uncovered propeller drive shaft 170 is rotated in main rotor downwash 730 in a rotation direction 720. Thus, as a result of the Magnus effect, the uncovered propeller drive shaft 170 generates a sideward force 740. This sideward force 740, in turn, results in sideward thrust applied to the rear section 114 of the fuselage 110 of the compound helicopter 100 of FIG. 1 to FIG. 4.

It should be noted that the Magnus effect is well-known to the person skilled in the art. Therefore, for brevity and conciseness the Magnus effect and its application for generation of sideward thrust by means of the uncovered propeller drive shaft 170 is not described in more detail.

Figure 8A:
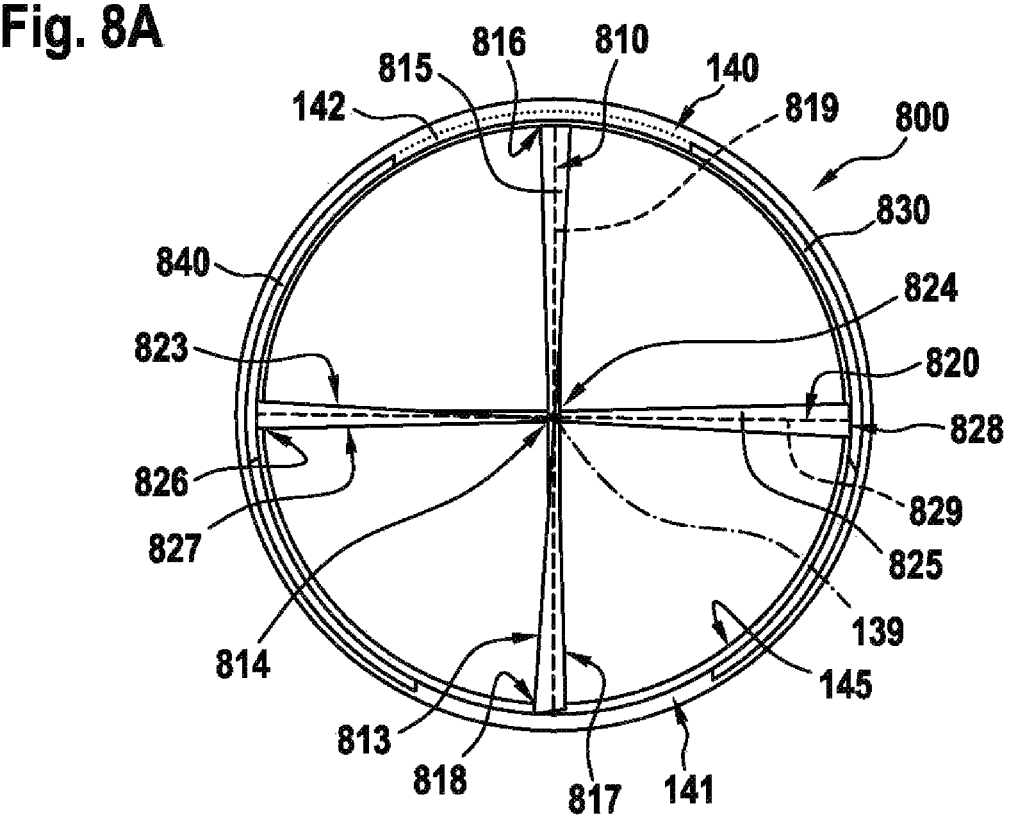
FIG. 8A shows a rear view of the shrouded duct of FIG. 1 to FIG. 4 with a yaw and pitch stability enhancement unit according to a first embodiment.

FIG. 8A shows the shrouded duct 140 of FIG. 1 to FIG. 4, seen in a direction VIII of FIG. 3. The shrouded duct 140, which forms the inner air duct 145 of FIG. 1, illustratively comprises a ring-shaped duct body 142 that forms a trailing edge 141. Furthermore, as described at FIG. 1, the shrouded duct 140 according to the present disclosure comprises a yaw and pitch stability enhancement unit 800. The yaw and pitch stability enhancement unit 800 is preferably at least provided to generate sideward thrust for main rotor anti-torque in forward flight condition of the compound helicopter 100 of FIG. 1 to FIG. 4, at least partly by deviating the propulsion airstream 198 of FIG. 1, for provision of an increased yaw and pitch stability of the compound helicopter 100 of FIG. 1 to FIG. 4.

According to one aspect, the yaw and pitch stability enhancement unit 800 comprises a rudder 810. The rudder 810 is preferably rotatably mounted to the shrouded duct 140 and illustrated in a neutral state, i.e., without deflection.

The rudder 810 preferably comprises an elongated rudder body 815 and is preferably vertically positioned with respect to the ring-shaped duct body 142 of the shrouded duct 140. Illustratively, the elongated rudder body 815 extends along an associated length axis 819 from an upper axial end 816 toward a lower axial end 818. By way of example, a central section 814 of the elongated rudder body 815 is positioned at the rotation axis 139 of the tail propeller 130 of FIG. 1 to FIG. 4.

The elongated rudder body 815 illustratively forms a leading edge 817 and a trailing edge 813. Preferably, the elongated rudder body 815 and, more generally, the rudder 810 is twisted around the length axis 819.

According to one aspect, the yaw and pitch stability enhancement unit 800 comprises in addition, or alternatively, at least one strut 820. The at least one strut 820 comprises an elongated strut body 825 and is preferably horizontally positioned with respect to the ring-shaped duct body 142 of the shrouded duct 140. By way of example, the elongated strut body 825 is arranged at an angle of approximately 90° with respect to the elongated rudder body 815.

Illustratively, the elongated strut body 825 extends along an associated length axis 829 from a left-hand axial end 826 toward a right-hand axial end 828. By way of example, a central section 824 of the elongated strut body 825 is coaxially positioned with respect to the rotation axis 139 of the tail propeller 130 of FIG. 1 to FIG. 4.

The elongated strut body 825 illustratively forms a leading edge 827 and a trailing edge 823. Preferably, the elongated strut body 825 and, more generally, the at least one strut 810 is twisted around the length axis 829.

According to one aspect, the yaw and pitch stability enhancement unit 800 comprises in addition, or alternatively, at least one calotte-shaped Fowler-type flap. Illustratively, two calotte-shaped Fowler-type flaps 830, 840 are provided, by way of example on diametrically opposed sides of the shrouded duct 140. These calotte-shaped Fowler-type flaps 830, 840 are described in more detail below at FIG. 11 to FIG. 15B.

Figure 8B:
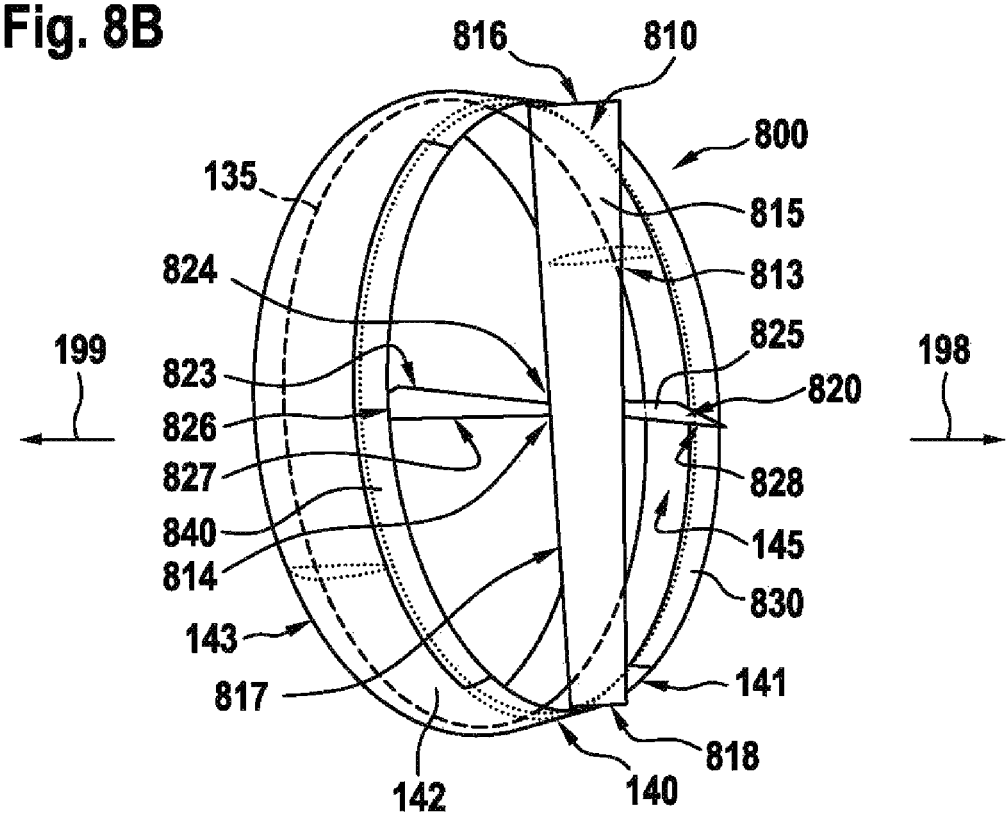
FIG. 8B shows a perspective view of the shrouded duct of FIG. 8A with the yaw and pitch stability enhancement unit.

FIG. 8B shows the shrouded duct 140 of FIG. 8A with the ring-shaped duct body 142 that forms the trailing edge 141 and a leading edge 143. The ring-shaped duct body 142 forms the inner air duct 145 through which the propulsion airstream 198 of FIG. 1 is guided from the leading edge 143 toward the trailing edge 141 to propel the compound helicopter 100 of FIG. 1 to FIG. 4 in the forward flight direction 199. The shrouded duct 140 further comprises the yaw and pitch stability enhancement unit 800 of FIG. 8A, which illustratively comprises the rudder 810 with the leading edge 817 and the trailing edge 813, the at least one strut 820 with the leading edge 827 and the trailing edge 823, and the calotte-shaped Fowler-type flaps 830, 840. The rudder 810 is again shown in the neutral state, i.e., without deflection.

By way of example, the shrouded duct 140 is illustrated together with the circular propeller disc 135 which is formed by rotation of the propeller 130 of FIG. 1 to Figure inside the inner air duct 145 of the shrouded duct 140. According to one aspect, the rudder 810 is arranged in the forward flight direction 199 downstream of the circular propeller disc 135, i.e., the circular propeller disc 135 is positioned closer to the leading edge 143 of the shrouded duct 140 than the rudder 810. Likewise, the at least one strut 820 is preferably arranged in the forward flight direction 199 downstream of the circular propeller disc 135, i.e., the circular propeller disc 135 is positioned closer to the leading edge 143 of the shrouded duct 140 than the at least one strut 820.

As the circular propeller disc 135 is positioned closer to the leading edge 143 of the shrouded duct 140 than the rudder 810 and/or the at least one strut 820, the rudder 810 and/or the at least one strut 820 are positioned in the propulsion airstream 198, which propels the compound helicopter 100 of FIG. 1 to FIG. 4 in the forward flight direction 199. However, the propulsion airstream 198 has not only a velocity in rearward direction, but also a superimposed rotation around the propeller axis 139 of FIG. 8A. This rotation is caused by the rotation of the propeller 130 of FIG. 1 to FIG. 4. Nevertheless, by positioning the rudder 810 and/or the at least one strut 820 in the propulsion airstream 198 and by twisting both as described at FIG. 8A, the propulsion airstream 198 may advantageously be straightened, thus, increasing a respective efficiency of the shrouded duct 140 at least a few percentages.

In any case, the at least one strut 820 is preferably used as a stator profile to support the propeller 130 of FIG. 1 to FIG. 4 in the shrouded duct 140 and, more specifically, in the inner air duct 145, and to transfer the thrust of the propeller 130 first to the shrouded duct 140 and then into the fuselage 110 of the compound helicopter 100 of FIG. 1 to FIG. 4. Usually, at least three struts are used. If these struts are positioned as illustrated behind the propeller 130 and equipped e.g., with rudders or suitable flaps, they may be used to support trim and control around the pitch axis P of FIG. 100. Therefore, the struts are preferably aerodynamically formed.

The rudder 810, in turn, is preferably provided at least for yaw control around the yaw axis Y of FIG. 1 of the compound helicopter 100 of FIG. 1 to FIG. 4 in forward flight. To this end, the rudder 810 may entirely be rotatable around its length axis 819 of FIG. 8A similar to a so-called pendulum rudder, as described below at FIG. 10A, or it may be implemented by means of a conventional discrete rudder, as described below at FIG. 9A and FIG. 9B.

Figure 9A:
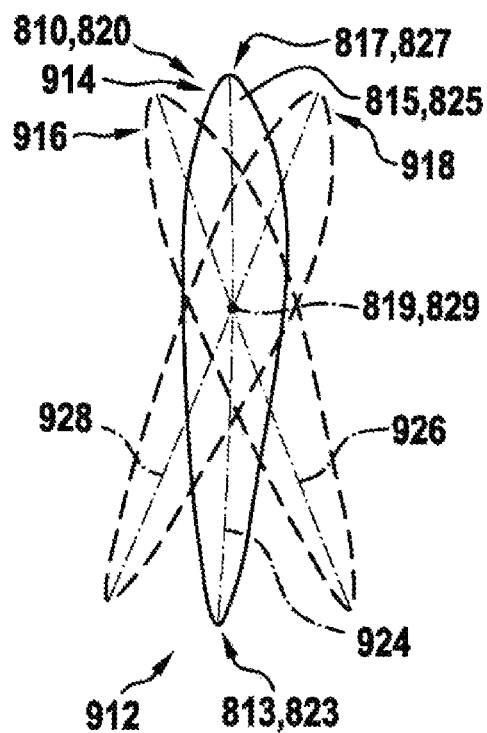
FIG. 9A and FIG. 9B show sectional views of a rudder and a horizontal strut of the yaw and pitch stability enhancement unit at different positions relative to the shrouded duct of FIG. 8A and FIG. 8B, FIG. 10A and FIG. 10B show sectional views of variants of the rudder and the horizontal strut of the yaw and pitch stability enhancement unit of FIG. 8A and FIG. 8B.

FIG. 9A shows the rudder 810 of FIG. 8A and FIG. 8B with the elongated rudder body 815 that extends along the length axis 819. The elongated rudder body 815 forms the leading edge 817 and the trailing edge 813.

According to one aspect, the elongated rudder body 815 comprises an airfoil-shaped profile 912 with a straight centerline 924. Illustratively, airfoil-shaped profile 912 and, thus, the straight centerline 924 is rotated around the length axis 819 of the elongated rudder body 815 between both axial ends (816, 818 in FIG. 8A and FIG. 8B) of the elongated rudder body 815 such that the elongated rudder body 815 is twisted around the length axis 819.

More specifically, the rudder 810 is formed with a central airfoil profile 914 located at the central section 814 of FIG. 8A and FIG. 8B, an upper airfoil profile 916 located at the upper axial end 816 of FIG. 8A and FIG. 8B, and a lower airfoil profile 918 located at the lower axial end 818 of FIG. 8A and FIG. 8B. The central airfoil profile 914 is illustrated with the straight centerline 924 in unrotated position, the upper airfoil profile 916 is illustrated with a straight centerline 926 that corresponds to the straight centerline 924 which is rotated around the length axis 819 in counterclockwise direction, and the lower airfoil profile 918 is illustrated with a straight centerline 928 that corresponds to the straight centerline 924 which is rotated around the length axis 819 in clockwise direction.

FIG. 9A is likewise applicable to the at least one strut 820 of FIG. 8A and FIG. 8B, which comprises the elongated strut body 825 that extends along the length axis 829, wherein the elongated strut body 825 forms the leading edge 827 and the trailing edge 823. In this case, the elongated strut body 825 comprises the airfoil-shaped profile 912 with the straight centerline 924, wherein the airfoil-shaped profile 912 and, thus, the straight centerline 924 is rotated around the length axis 829 of the elongated strut body 825 between both axial ends (826, 828 in FIG. 8A and FIG. 8B) of the elongated strut body 825 such that the elongated strut body 825 is twisted around the length axis 829. Accordingly, the at least one strut 820 comprises the central airfoil profile 914 located at the central section 824 of FIG. 8A and FIG. 8B, the airfoil profile 916 located at the left-hand axial end 826 of FIG. 8A and FIG. 8B, and the airfoil profile 918 located at the right-hand axial end 828 of FIG. 8A and FIG. 8B. Consequently, the central airfoil profile 914 is illustrated with the straight centerline 924 in unrotated position, the airfoil profile 916 is illustrated with the straight centerline 926 that corresponds to the straight centerline 924 which is rotated around the length axis 829 in counterclockwise direction, and the airfoil profile 918 is illustrated with the straight centerline 928 that corresponds to the straight centerline 924 which is rotated around the length axis 829 in clockwise direction.

Figure 9B:
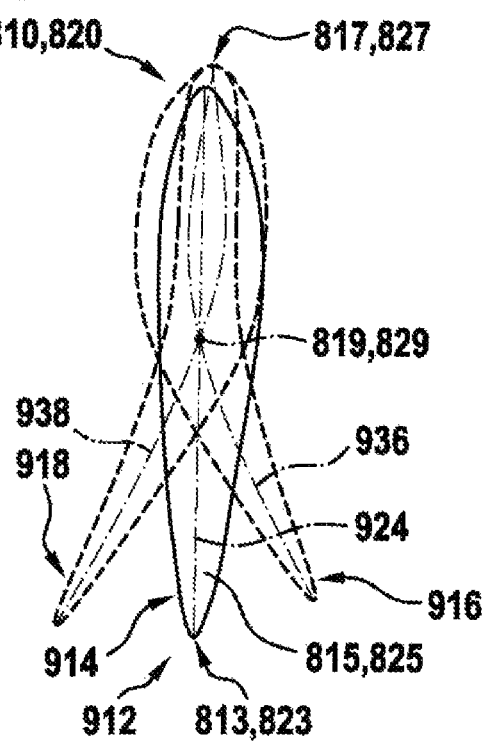

FIG. 9B shows the airfoil profiles 914, 916, 918 of the rudder 810 (or the at least one strut 820) according of FIG. 9A. However, although the airfoil profile 914 still comprises the straight centerline 924 of FIG. 9A, the airfoil profiles 916, 918 now comprise in contrast to FIG. 9A cambered centerlines 936, 938 with a varying camber according to an alternative realization.

In other words, the camber of the centerlines 936, 938 is varied around the length axis 819 (or 829) of the elongated rudder body 815 (or the elongated strut body 825) from the central section (814 or 824 in FIG. 8A and FIG. 8B) toward both axial ends (816, 818 or 826, 828 in FIG. 8A and FIG. 8B) of the elongated rudder body 815 (or the elongated strut body 825) in order to obtain the twist of the elongated rudder body 815 (or the elongated strut body 825). By way of example, the centerline 936 is illustratively cambered in counterclockwise direction and the centerline 938 is illustratively cambered in clockwise direction.

Figure 10A:
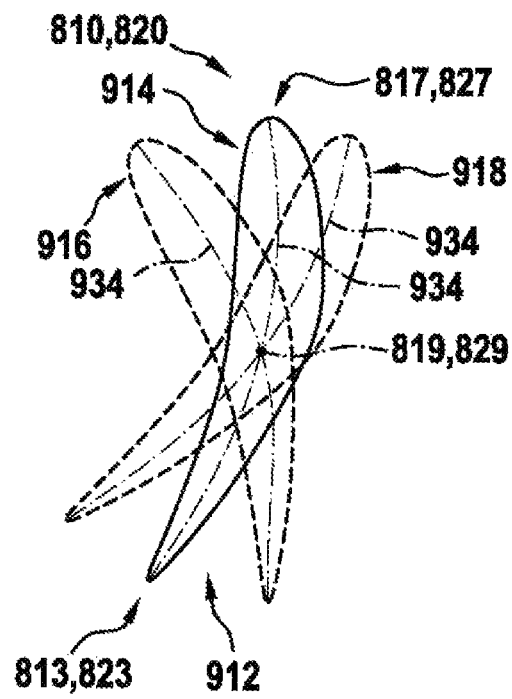

FIG. 10A shows the airfoil profiles 914, 916, 918 of the rudder 810 (or the at least one strut 820) according of FIG. 9A. However, in contrast to FIG. 9A all airfoil profiles 914, 916, 918 now comprise a cambered centerline 934.

Figure 10B:
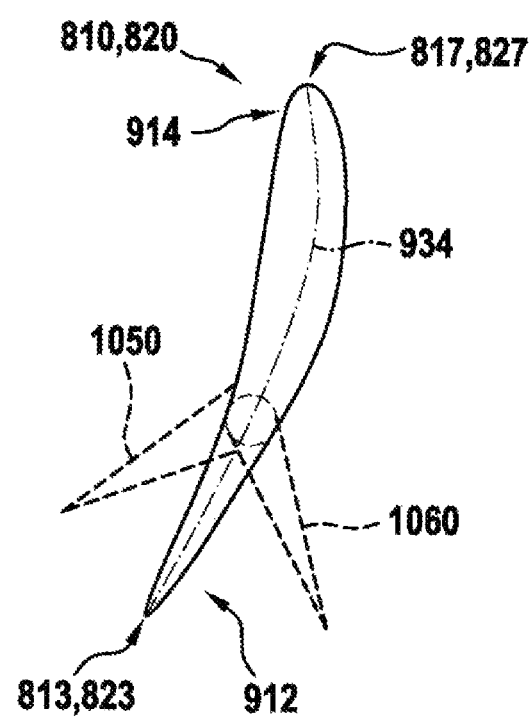

FIG. 10B shows the airfoil profile 914 of the rudder 810 (or the at least one strut 820) with the cambered centerline 934 according of FIG. 10A. However, in contrast to FIG. 10A the twist of the elongated rudder body 815 (or the elongated strut body 825) is now obtained by providing the elongated rudder body 815 (or the elongated strut body 825) with one or more rudder flaps. By way of example, two rudder flaps 1050, 1060 are illustrated, which are deflected in opposite directions by way of example.

If the elongated rudder body 815 is provided with the one or more rudder flaps 1050, 1060, then the rudder 810 as such may be mounted fixedly to the shrouded duct 140 of FIG. 8A and FIG. 8B. In other words, it suffices if either the rudder 810 as a whole or the rudder flaps 1050, 1060 together, or separately, are rotatable.

Figure 11:
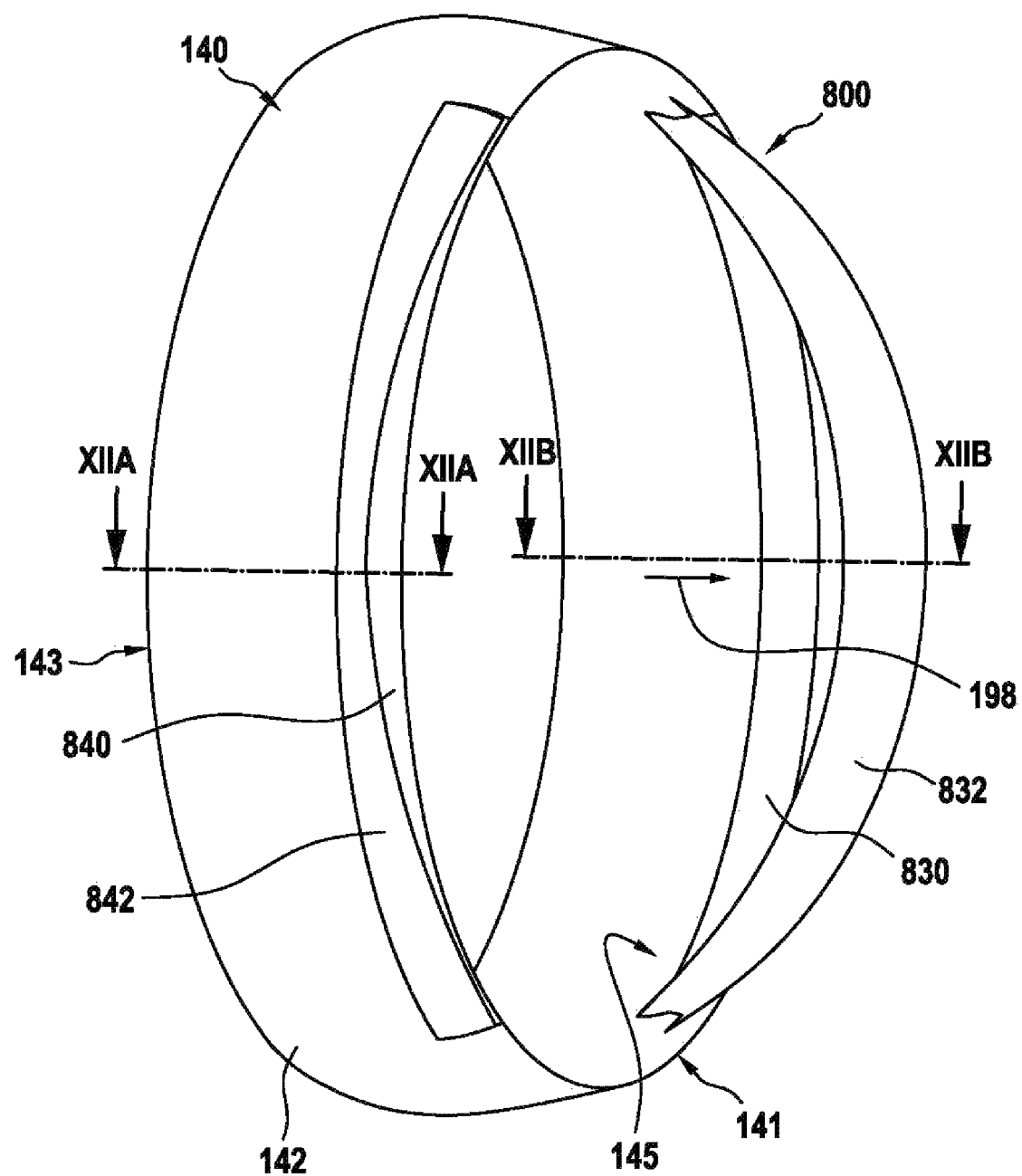
FIG. 11 shows a perspective view of the shrouded duct of FIG. 1 to FIG. 4 with a yaw and pitch stability enhancement unit according to a second embodiment.

FIG. 11 shows the shrouded duct 140 of FIG. 8A and FIG. 8B with the ring-shaped duct body 142 that forms the trailing edge 141 and the leading edge 143. The ring-shaped duct body 142 forms the inner air duct 145 through which the propulsion airstream 198 of FIG. 1 is guided from the leading edge 143 toward the trailing edge 141. The shrouded duct 140 further comprises the yaw and pitch stability enhancement unit 800 of FIG. 8A and FIG. 8B. However, in contrast to FIG. 8A and FIG. 8B the yaw and pitch stability enhancement unit 800 now only comprises the calotte-shaped Fowler-type flaps 830, 840 in order to illustrate that in selected realizations the rudder 810 and the at least one strut 820 according to FIG. 8A and FIG. 8B may also be omitted. Furthermore, it should be noted that the calotte-shaped Fowler-type flap 840 may also be omitted.

Illustratively, the calotte-shaped Fowler-type flaps 830, 840 are arranged on, or close to, the trailing edge 141 of the shrouded duct 140. Preferably, the calotte-shaped Fowler-type flaps 830, 840 form at least partly the trailing edge 141 of the shrouded duct 140 in an associated neutral position.

According to one aspect, the calotte-shaped Fowler-type flaps 830, 840 are at least partly deployable from the ring-shaped duct body 142 of the shrouded duct 140 and/or at least partly retractable into the ring-shaped duct body 142 of the shrouded duct 140. By way of example, the calotte-shaped Fowler-type flap 830 is shown in the associated neutral position, but also in a completely deployed position. In this completely deployed position, the calotte-shaped Fowler-type flap is labelled with the reference sign 832. Similarly, the calotte-shaped Fowler-type flap 840 is shown in the associated neutral position, but also by way of example in a completely retracted position. In this completely retracted position, the calotte-shaped Fowler-type flap is labelled with the reference sign 842.

Figure 12A:
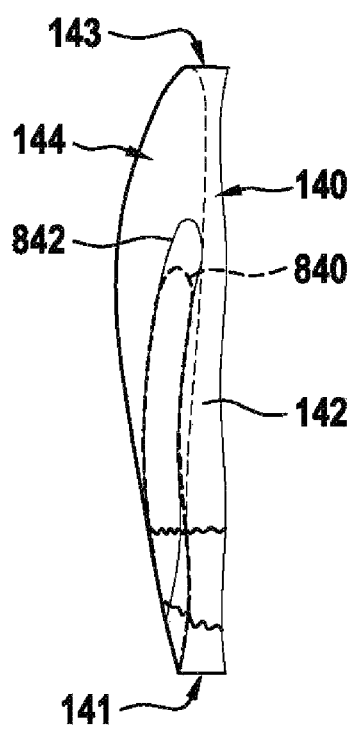
FIG. 12A shows a sectional view of the shrouded duct of FIG. 11, seen along a cutting line XIIA-XIIA of FIG. 11.

FIG. 12A shows the shrouded duct 140 of FIG. 11 with the ring-shaped duct body 142 comprising the trailing edge 141 and the leading edge 143. The shrouded duct 140 further comprises the calotte-shaped Fowler-type flap 840 which is shown in the associated neutral position, in which the calotte-shaped Fowler-type flap 840 illustratively forms the trailing edge 141 of the shrouded duct 140, and in the completely retracted position, in which the calotte-shaped Fowler-type flap is farther retracted into the shrouded duct 140 and labelled with the reference sign 842.

More specifically, according to one aspect the ring-shaped duct body 142 comprises a hollow interior 144. The hollow interior 144 is preferably formed such that the calotte-shaped Fowler-type flap 840, 842 may at least partly be accommodated in the hollow interior 144 in the associated neutral position (840) as well as in the completely retracted position (842), as illustrated.

Figure 12B:
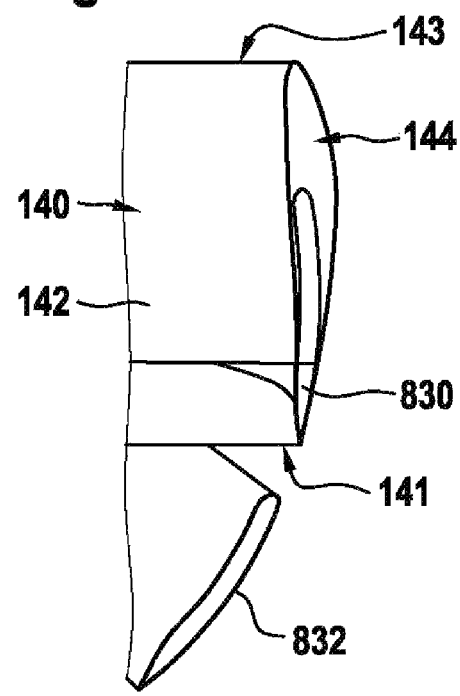
FIG. 12B shows a sectional view of the shrouded duct of FIG. 11, seen along a cutting line XIIB-XIIB of FIG. 11, FIG. 13A and FIG. 13B show sectional views of different operating states of the shrouded duct of FIG. 12B, FIG. 14A to FIG. 15B show sectional views of different operating states of variants of the shrouded duct of FIG. 12B.

FIG. 12B shows the shrouded duct 140 of FIG. 11 with the ring-shaped duct body 142 comprising the trailing edge 141 and the leading edge 143. The shrouded duct 140 further comprises the calotte-shaped Fowler-type flap 830 which is shown in the associated neutral position, in which the calotte-shaped Fowler-type flap 830 illustratively forms the trailing edge 141 of the shrouded duct 140, and in the completely deployed position, in which the calotte-shaped Fowler-type flap is completely extracted and deployed from the shrouded duct 140 and labelled with the reference sign 832.

More specifically, as described at FIG. 12A the ring-shaped duct body 142 preferably comprises the hollow interior 144. The hollow interior 144 is preferably formed such that the calotte-shaped Fowler-type flap 830, 832 may at least partly be accommodated in the hollow interior 144 in the associated neutral position (830) and extracted and deployed therefrom into the completely deployed position (832), as illustrated.

Figure 13A:
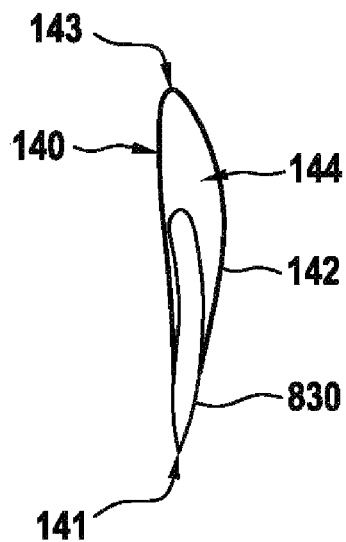

FIG. 13A shows the shrouded duct 140 with the trailing edge 141 and the leading edge 143 according to FIG. 12B, wherein the shrouded duct 140 has the ring-shaped duct body 142 that forms the hollow interior 144. FIG. 13A further illustrates the calotte-shaped Fowler-type flap 830 in the associated neutral position, wherein the calotte-shaped Fowler-type flap 830 is at least partly accommodated in the hollow interior 144 and forms the trailing edge 141 of the shrouded duct 140.

Figure 13B:
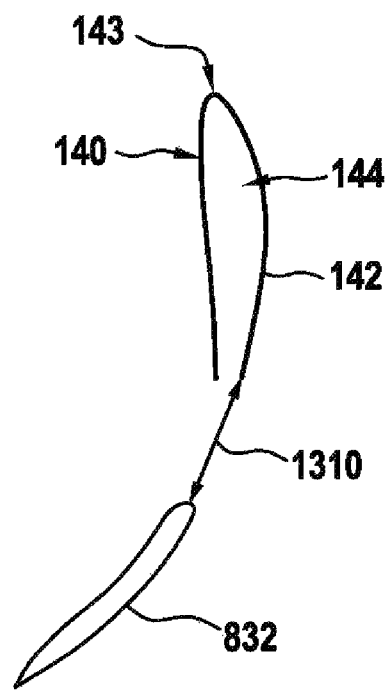

FIG. 13B shows the shrouded duct 140 with the trailing edge 141 and the leading edge 143 according to FIG. 12B, wherein the shrouded duct 140 has the ring-shaped duct body 142 that forms the hollow interior 144. FIG. 13B further illustrates the calotte-shaped Fowler-type flap 832 in the completely deployed position, in which the calotte-shaped Fowler-type flap 832 is spaced apart from the ring-shaped duct body 142 by a predetermined gap 1310.

The predetermined gap 1310 may, however, lead to aerodynamically unfavorable conditions at the trailing edge 141. Such aerodynamically unfavorable conditions may be prevented by modifying the calotte-shaped Fowler-type flap 830 as described in detail below at FIG. 14A to 15B.

Figure 14A:
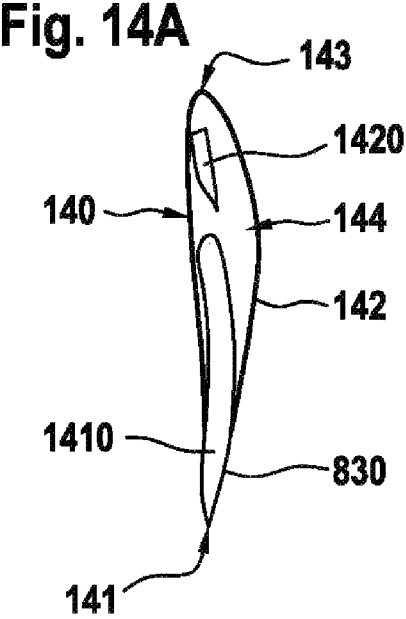

FIG. 14A shows the shrouded duct 140 with the trailing edge 141 and the leading edge 143 according to FIG. 13A, according to which the shrouded duct 140 has the ring-shaped duct body 142 that forms the hollow interior 144, wherein the calotte-shaped Fowler-type flap 830 is at least partly accommodated in the associated neutral position such that it forms the trailing edge 141 of the shrouded duct 140. However, in contrast to FIG. 13A the calotte-shaped Fowler-type flap 830 is now formed as a multi-part component that illustratively comprises two separate flap components 1410, 1420 which are, preferably, spaced apart from each other. The two separate flap components 1410, 1420 are preferably simultaneously deployable from the ring-shaped duct body 142.

Figure 14B:
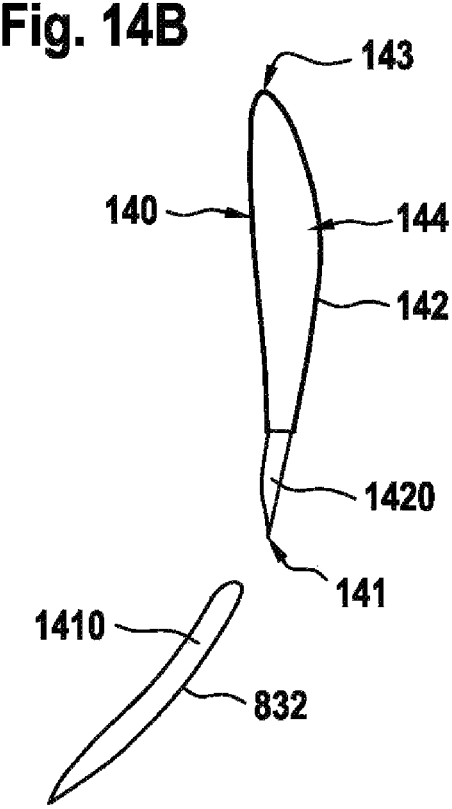

FIG. 14B shows the shrouded duct 140 with the trailing edge 141 and the leading edge 143 according to FIG. 14A, wherein the shrouded duct 140 has the ring-shaped duct body 142 that forms the hollow interior 144. However, in contrast to FIG. 14A the calotte-shaped Fowler-type flap 832 with the two separate flap components 1410, 1420 is now illustrated in the completely deployed position, in which the flap component 1420 preferably forms the trailing edge 141 of the shrouded duct 140, while the flap component 1410 is illustratively spaced apart from the ring-shaped duct body 142.

Figure 15A:
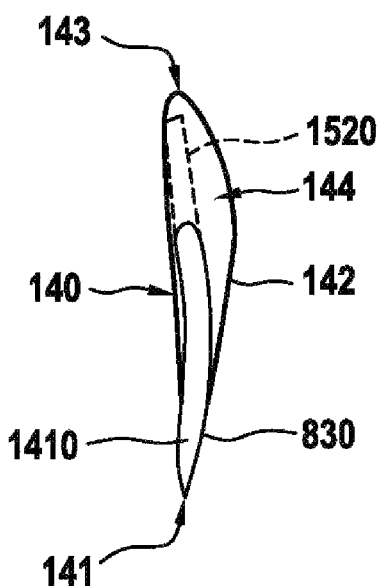

FIG. 15A shows the shrouded duct 140 with the trailing edge 141 and the leading edge 143 according to FIG. 13A, according to which the shrouded duct 140 has the ring-shaped duct body 142 that forms the hollow interior 144, wherein the calotte-shaped Fowler-type flap 830 is at least partly accommodated in the associated neutral position such that it forms the trailing edge 141 of the shrouded duct 140. However, in contrast to FIG. 13A the calotte-shaped Fowler-type flap 830 is now formed with the flap component 1410 of FIG. 14A and an extension 1520 that abuts and, thus, prolongates the flap component 1410 in direction of the leading edge 143 of the shrouded duct 140.

Figure 15B:
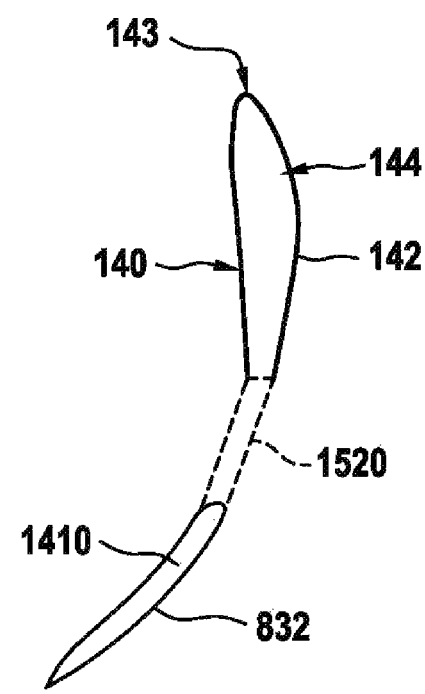

FIG. 15B shows the shrouded duct 140 with the trailing edge 141 and the leading edge 143 according to FIG. 15A, wherein the shrouded duct 140 has the ring-shaped duct body 142 that forms the hollow interior 144. However, in contrast to FIG. 15A the calotte-shaped Fowler-type flap 832 with the flap component 1410 and the extension 1520 is now illustrated in the completely deployed position.

Figure 16:
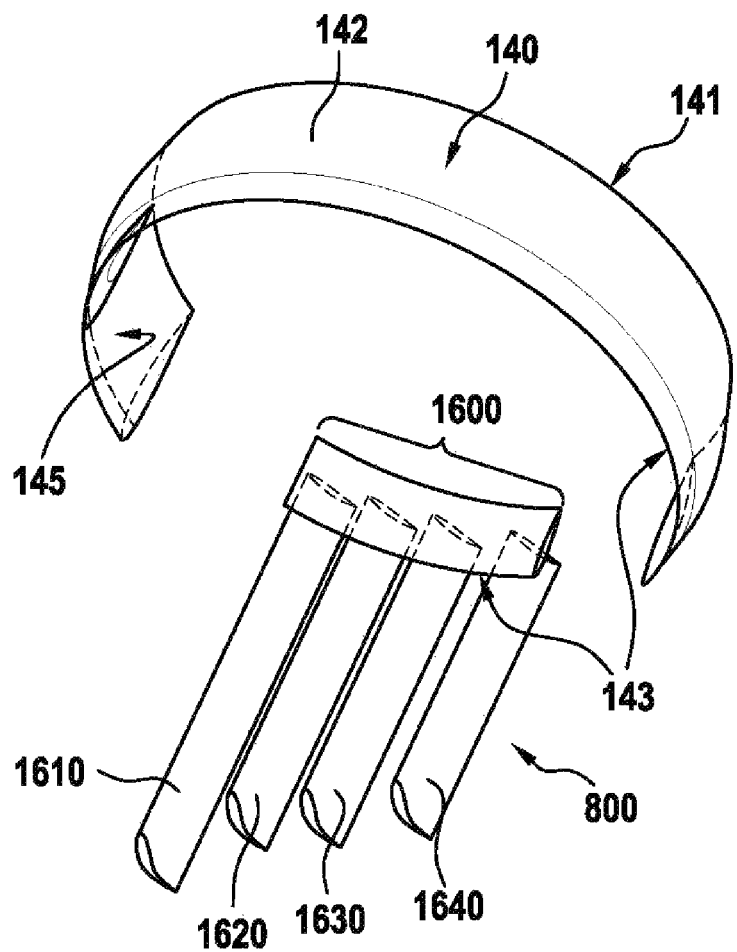
FIG. 16 shows a perspective view of the shrouded duct of FIG. 1 to FIG. 4 with a yaw and pitch stability enhancement unit according to a third embodiment.

FIG. 16 shows the shrouded duct 140 with the trailing edge 141 and the leading edge 143 according to FIG. 11, wherein the shrouded duct 140 has the ring-shaped duct body 142 that forms the inner air duct 145. The shrouded duct 140 comprises the yaw and pitch stability enhancement unit 800.

However, in contrast to FIG. 11 the yaw and pitch stability enhancement unit 800 now illustratively comprises a plurality of airfoil-shaped aerodynamic devices 1610, 1620, 1630, 1640, in particular high lift airfoils, instead of the calotte-shaped Fowler-type flaps 830, 840 of FIG. 11. The airfoil-shaped aerodynamic devices 1610, 1620, 1630, 1640 are preferably arranged at least approximately in parallel to the associated roll axis R of the compound helicopter 100 of FIG. 1 and form a transition from the rear section 114 of the compound helicopter 100 to the leading edge 143 of the shrouded duct 140. Illustratively, the airfoil-shaped aerodynamic devices 1610, 1620, 1630, 1640 are connected to a section 1600 of the shrouded duct 140 that has a shorter axial length than the remaining part of the shrouded duct 140.

More specifically, the shrouded duct 140 is set back in the section 1600 that is located in a lower area of the shrouded duct 140. In this lower area, a respective downwash of the main rotor 120 of the compound helicopter 100 of FIG. 1 to FIG. 4 hits the shrouded duct 140 essentially vertically and, thereby, creates an aerodynamically damaging flow which, in turn, creates a strong aerodynamic drag in flow direction of the downwash. This drag is amplified when the propeller 130 of FIG. 1 to FIG. 4 in the inner air duct 145 is sucking in flow at the same time. In the lower area and, more specifically, in the section 1600, it is therefore advantageous to reduce the depth, i.e., the axial length of the shrouded duct 140, as described above. Thus, the airfoil-shaped aerodynamic devices 1610, 1620, 1630, 1640 may deflect the aerodynamically damaging flow laterally and use the latter thereby to generate an additional counter torque to the torque created by the main rotor 120 of the compound helicopter 100 of FIG. 1 to FIG. 4. This may especially be helpful in a respective transition phase between pure hover and forward flight of the compound helicopter 100 of FIG. 1 to FIG. 4.

Figure 17:
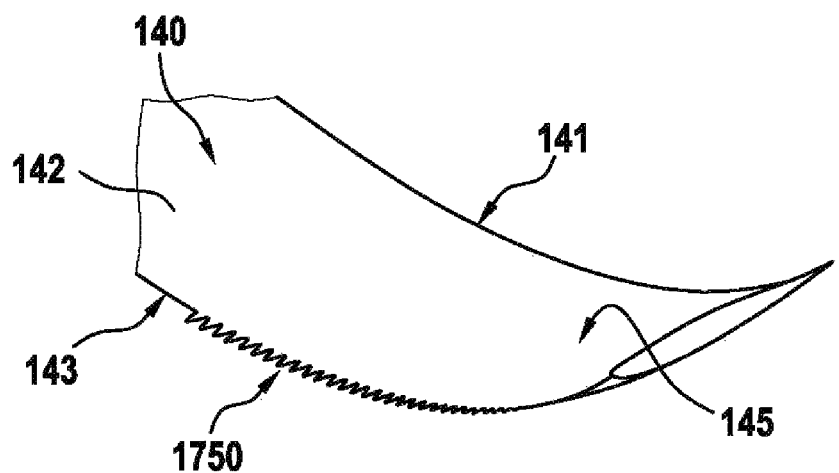
FIG. 17 to FIG. 18B show a perspective view of the shrouded duct of FIG. 1 to FIG. 4 with a yaw and pitch stability enhancement unit according to a fourth embodiment.

FIG. 17 shows the shrouded duct 140 with the ring-shaped duct body 142 and the leading edge 143 according to any one of FIG. 8A to FIG. 16. According to one aspect, the leading edge 143 is now alternatively, or in addition, provided with a plurality of spaced tubercles 1750. The plurality of spaced tubercles 1750 may be provided in one or more selected sections of the perimeter of the ring-shaped duct body 142, or along the entire perimeter.

Figure 18A:
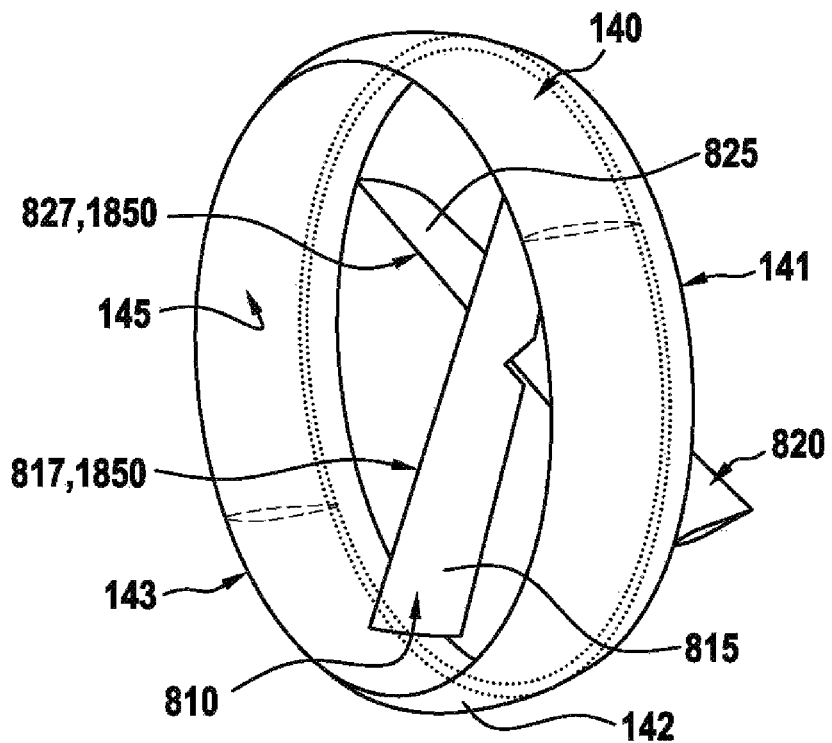

FIG. 18A shows the shrouded duct 140 with the trailing edge 141 and the leading edge 143 according to FIG. 8A and FIG. 8B, wherein the shrouded duct 140 has the ring-shaped duct body 142 that forms the inner air duct 145. The shrouded duct 140 further comprises the yaw and pitch stability enhancement unit 800 of FIG. 8A and FIG. 8B. However, in contrast to FIG. 8A and FIG. 8B the yaw and pitch stability enhancement unit 800 now only comprises the rudder 810 with the elongated rudder body 815 and the at least one strut 820 with the elongated strut body 825 in order to illustrate that in selected realizations the calotte-shaped Fowler-type flaps 830, 840 according to FIG. 8A and FIG. 8B may be omitted.

According to one aspect, the leading edge 817 of the elongated rudder body 815 of the rudder 810 is now alternatively, or in addition, provided with a plurality of spaced tubercles 1850. In addition, or alternatively, the leading edge 827 of the elongated strut body 825 may be provided with the plurality of spaced tubercles 1850. In both cases, the leading edges 817, 827 may be provided in one or more sections, or over their entire lengths, with the spaced tubercles 1850.

Figure 18B:
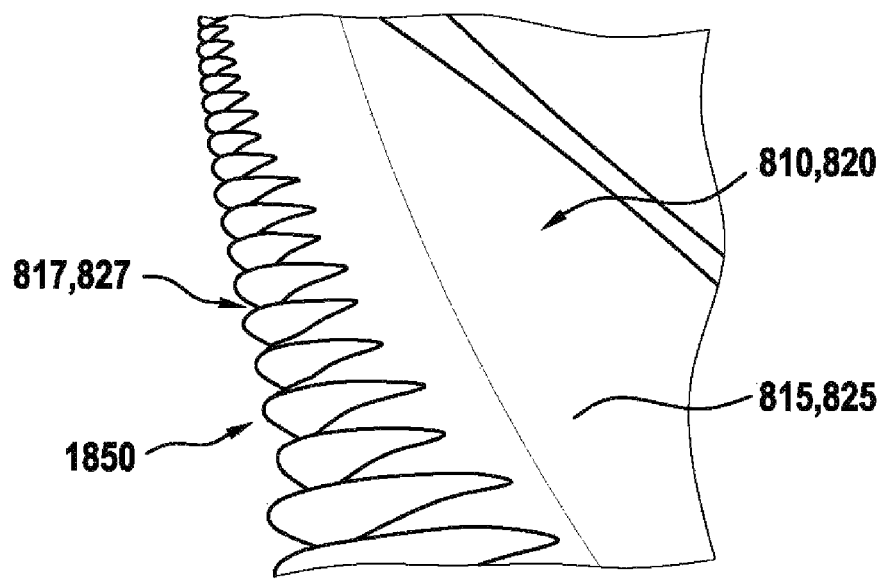

FIG. 18B shows the elongated rudder body 815 of the rudder 810 according to FIG. 18A with the spaced tubercles 1850 on the leading edge 817, which are magnified for purposes of clarification. FIG. 18B may analogously be applied to the at least one strut 820 of FIG. 18A and, thus, also shows the elongated strut body 825 of the at least one strut 820 according to FIG. 18A with the spaced tubercles 1850 on the leading edge 827.

As described above at FIG. 17 to FIG. 18B, the leading edge 143 of the shrouded duct 140 may be provided with the plurality of spaced tubercles 1750 and/or the leading edge 817 of the elongated rudder body 815 of the rudder 810 may be provided with the plurality of spaced tubercles 1850 and/or the leading edge 827 of the elongated strut body 825 of the at least one strut 820 may be provided with the plurality of spaced tubercles 1850. Thus, a respective airflow separation that occurs at the leading edges 143, 817, and/or 827 can be shifted to higher angles of attack. Accordingly, such an airflow separation that would cause higher drag and an increased disturbance of the airflow inside the shrouded duct 140 may advantageously be avoided or, at least, be substantially reduced. Thus, an underlying efficiency of the shrouded duct 140, the rudder 810, and/or the at least one strut 820 is at least less reduced for high deflection angles of those parts, as the airflow does not separate.

Figure 19A:
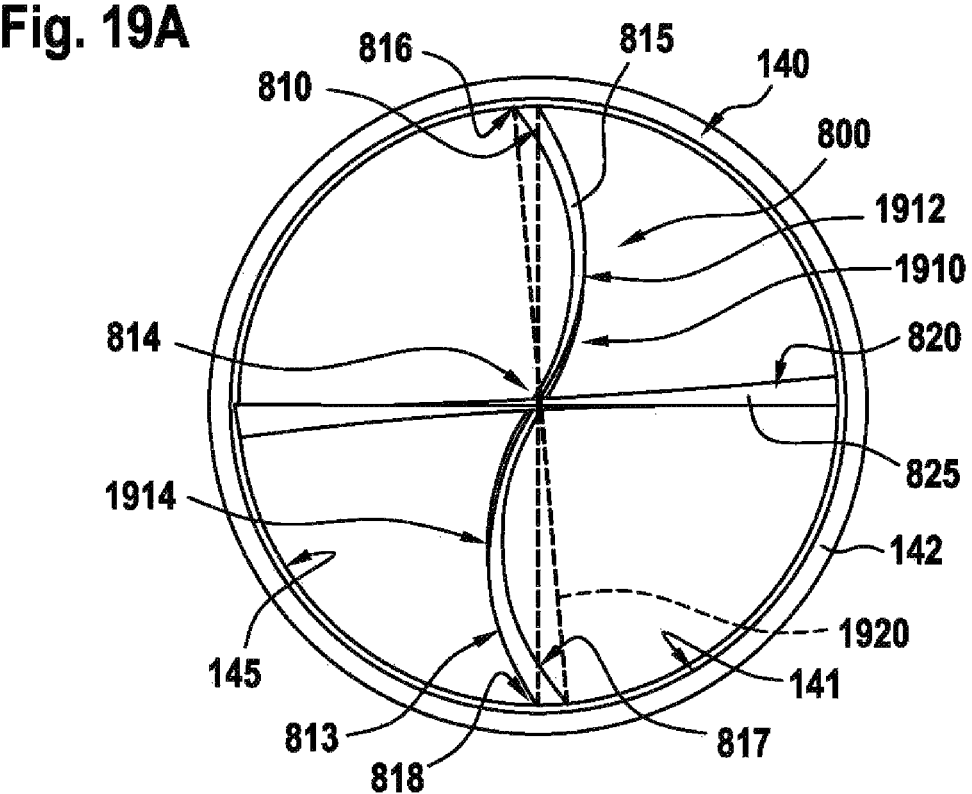
FIG. 19A to FIG. 23 show different views of the shrouded duct of FIG. 1 to FIG. 4 with supplementary improvements.

FIG. 19A shows the shrouded duct 140 with the trailing edge 141 according to FIG. 8A and FIG. 8B, wherein the shrouded duct 140 has the ring-shaped duct body 142 that forms the inner air duct 145. The shrouded duct 140 further comprises the yaw and pitch stability enhancement unit 800 of FIG. 8A and FIG. 8B. However, in contrast to FIG. 8A and FIG. 8B the yaw and pitch stability enhancement unit 800 now only comprises the rudder 810 with the elongated rudder body 815 and the at least one strut 820 with the elongated strut body 825 in order to illustrate that in selected realizations the calotte-shaped Fowler-type flaps 830, 840 according to FIG. 8A and FIG. 8B may be omitted.

According to one aspect, the rudder 810 and, more specifically, the elongated rudder body 815 that forms the leading edge 813 and the trailing edge 817 now exhibits an undulated shaping 1910. Illustratively, the undulated shaping 1910 corresponds at least essentially to an S-shape that is formed with two turning points 1912, 1914 between both axial ends 816, 818 of the elongated rudder body 815. However, other undulation shapes are likewise contemplated, such as e.g., simple C-shapes with a single turning point, double S-shapes with four turning points, and so on.

Preferably, the undulated shaping 1910 is formed as an out-of-plane undulation. More specifically, a respective rudder body plane 1920 is illustratively formed by virtually connecting the leading edge 813 at the axial ends 816, 818 and the trailing edge 817 at the axial ends 816, 818. Accordingly, the axial ends 816, 818 as well as the central section 814 of the elongated rudder body 815 are lying in the rudder body plane 1920, while the elongated rudder body 815 as such is essentially lying outside of the rudder body plane 1920 and, therefore, exhibits an out-of-plane undulation.

Figure 19B:
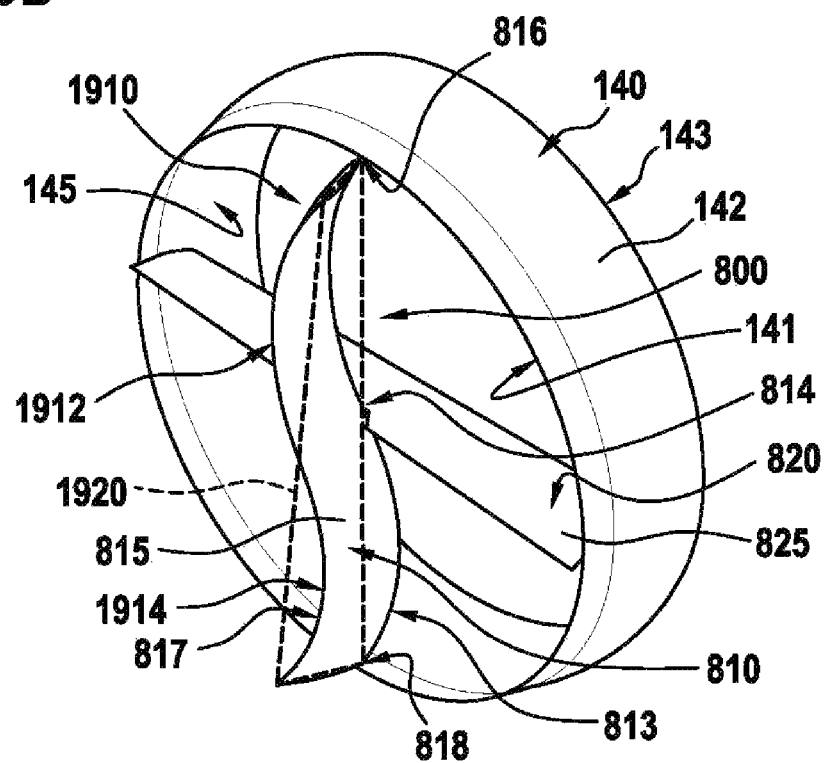

FIG. 19B shows the shrouded duct 140 with the yaw and pitch stability enhancement unit 800 that comprises the rudder 810 with the elongated rudder body 815, as well as the at least one strut 820 according to FIG. 19A. FIG. 19B further illustrates the undulated shaping 1910 of the elongated rudder body 815 in the form of an out-of-plane undulation relative to the rudder body plane 1920 of FIG. 19A. By providing the elongated rudder body 815 with the undulated shaping 1910, vortices that are generated by the propeller blades (132 in FIG. 1) upstream of the rudder 810 do not hit the rudder all at once, compared to a straight rudder as illustrated in FIG. 8A and FIG. 8B. Thus, an important source of noise may be eliminated and, accordingly, noise generation may be reduced significantly.

However, any deflection of the rudder 810 will move the elongated rudder body 815 at least in sections closer to the propeller blades (132 in FIG. 1). To avoid this, an in-plane undulation may be advantageous, either instead of the out-of-plane undulation or in combination therewith, as described hereinafter.

Figure 20A:
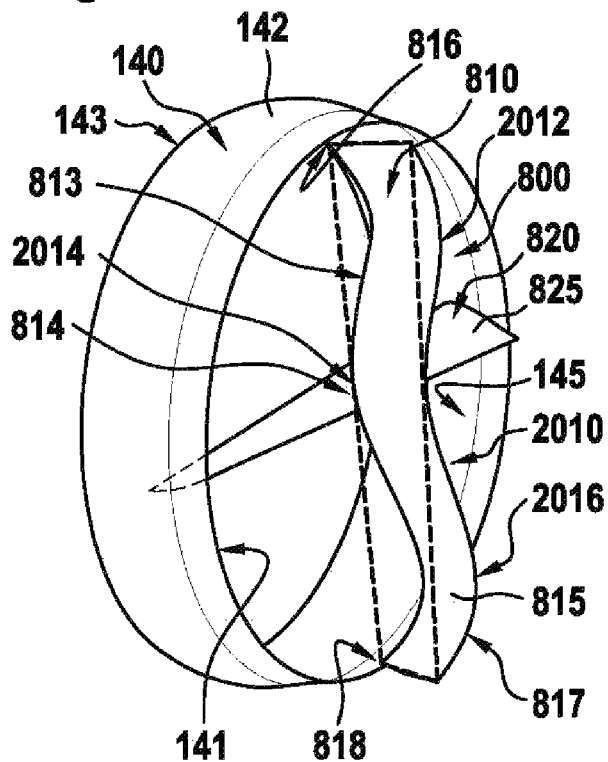
Figure 20B:
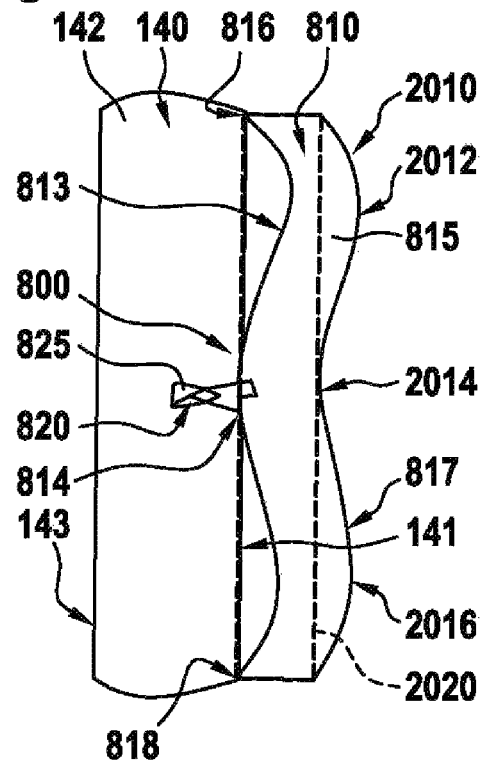

FIG. 20A and FIG. 20B show the shrouded duct 140 with the trailing edge 141 according to FIG. 8A and FIG. 8B, wherein the shrouded duct 140 has the ring-shaped duct body 142 that forms the inner air duct 145. The shrouded duct 140 further comprises the yaw and pitch stability enhancement unit 800 of FIG. 8A and FIG. 8B. However, in contrast to FIG. 8A and FIG. 8B the yaw and pitch stability enhancement unit 800 now only comprises the rudder 810 with the elongated rudder body 815 and the at least one strut 820 with the elongated strut body 825 in order to illustrate that in selected realizations the calotte-shaped Fowler-type flaps 830, 840 according to FIG. 8A and FIG. 8B may be omitted.

In analogy to FIG. 19A and FIG. 19B, the rudder 810 and, more specifically, the elongated rudder body 815 that forms the leading edge 813 and the trailing edge 817 exhibits an undulated shaping that is now labelled with the reference sign 2010. Illustratively, the undulated shaping 2010 corresponds at least essentially to a double C-shape that is formed with three turning points 2012, 2014, 2016 between both axial ends 816, 818 of the elongated rudder body 815. However, other undulation shapes are likewise contemplated, such as e.g., simple C-shapes with a single turning point, quadruple C-shapes with five turning points, and so on.

Preferably, the undulated shaping 2010 is formed as an in-plane undulation. More specifically, a respective rudder body plane 2020 is illustratively formed by virtually connecting the leading edge 813 at the axial ends 816, 818 and the trailing edge 817 at the axial ends 816, 818. Accordingly, the rudder body plane 2020 illustratively corresponds to the drawing layer in FIG. 20B and the elongated rudder body 815 is completely lying in the drawing layer, i.e., the rudder body plane 2020, and, therefore, exhibits an in-plane undulation.

Figure 21A:
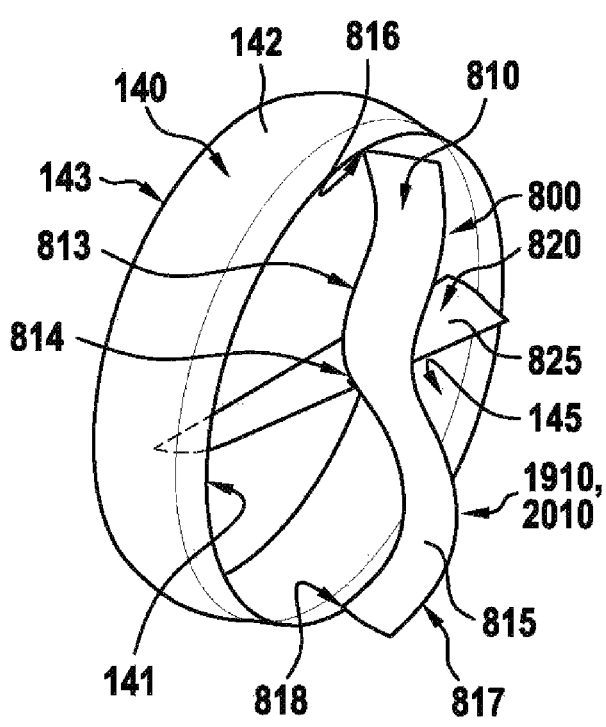
Figure 21B:
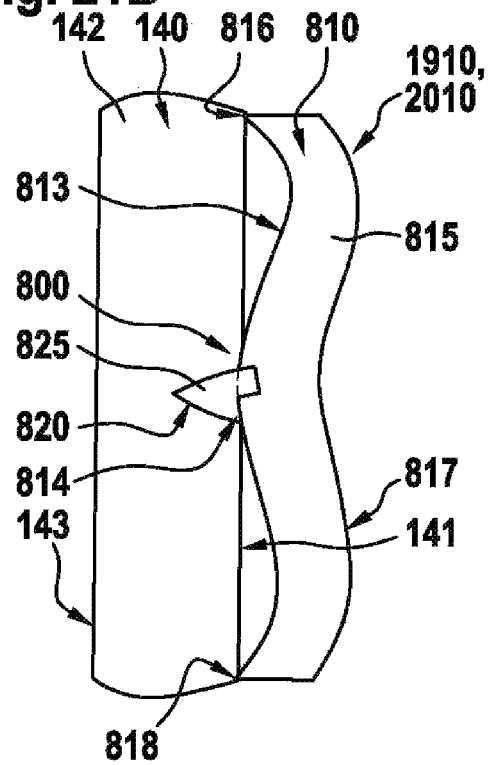

FIG. 21A and FIG. 21B show the shrouded duct 140 with the trailing edge 141 according to FIG. 8A and FIG. 8B, wherein the shrouded duct 140 has the ring-shaped duct body 142 that forms the inner air duct 145. The shrouded duct 140 further comprises the yaw and pitch stability enhancement unit 800 of FIG. 8A and FIG. 8B. However, in contrast to FIG. 8A and FIG. 8B the yaw and pitch stability enhancement unit 800 now only comprises the rudder 810 with the elongated rudder body 815 and the at least one strut 820 with the elongated strut body 825 in order to illustrate that in selected realizations the calotte-shaped Fowler-type flaps 830, 840 according to FIG. 8A and FIG. 8B may be omitted.

According to one aspect, the rudder 810 and, more specifically, the elongated rudder body 815 now exhibits a combination of the undulated shaping 1910 of FIG. 19A and FIG. 19B and the undulated shaping 2010 of FIG. 20A and FIG. 20B. In other words, the elongated rudder body 815 now exhibits both an out-of-plane undulation and an in-plane undulation.

Figure 22:
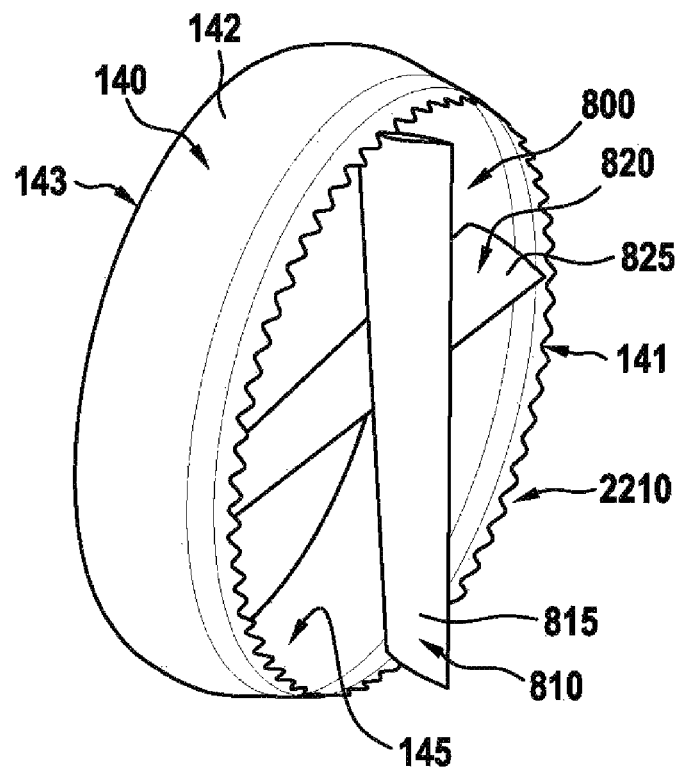
Figure 23:
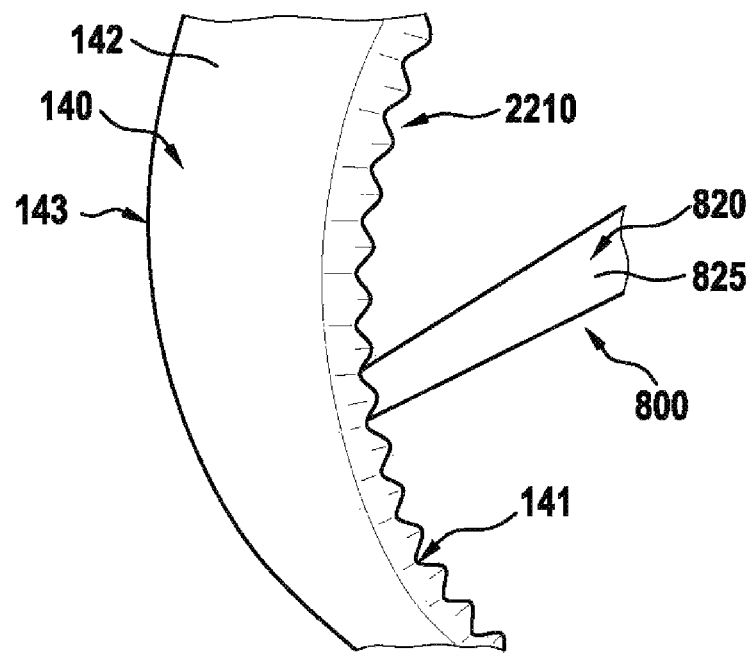

FIG. 22 and FIG. 23 show the shrouded duct 140 with the leading edge 143 and the trailing edge 141 according to FIG. 8A and FIG. 8B, wherein the shrouded duct 140 has the ring-shaped duct body 142 that forms the inner air duct 145. The shrouded duct 140 further comprises the yaw and pitch stability enhancement unit 800 of FIG. 8A and FIG. 8B. However, in contrast to FIG. 8A and FIG. 8B the yaw and pitch stability enhancement unit 800 now only comprises the rudder 810 with the elongated rudder body 815 and the at least one strut 820 with the elongated strut body 825.

According to one aspect, the trailing edge 141 of the shrouded air duct 140 is now formed as an undulated edge 2210. The undulated edge 2210 is preferably at least provided to reduce noise generation at the shrouded duct 140.

By way of example, the undulated edge 2210 is formed in FIG. 22 by a plurality of chevrons 2210, i.e., by tooth-shaped protrusions formed in axial direction of the shrouded duct 140. In FIG. 23, the undulated edge 2210 is illustratively formed by means of a wave-shaped border with protrusions formed in radial direction of the shrouded duct 140.

At this point, it should be noted that the shrouded duct 140 is described above as being provided with the yaw and pitch stability enhancement unit 800, which in turn is described with different components according to different embodiments. In other words, the yaw and pitch stability enhancement unit 800 is described to comprise one or more of the rudder 810, the at least one strut 820, the calotte-shaped Fowler-type flaps 830, 840, and the airfoil-shaped aerodynamic devices 1610, 1620, 1630, 1640. Furthermore, the rudder 810 and/or the at least one strut 820 may be provided with the spaced tubercles 1850. Furthermore, the rudder 810 may have the undulated shaping 1910, 2010. Moreover, the leading edge 143 of the shrouded duct 140 may be provided with the spaced tubercles 1750 and/or its trailing edge 141 may be provided with the undulated edge 2210. However, any suitable combination of these characteristics other than the ones described above is likewise contemplated and may be determined in an application-specific manner dependent on an underlying configuration of the compound helicopter 100 of FIG. 1 to FIG. 4. Determination of such a suitable combination is, nevertheless, considered to fall into the common knowledge of the person skilled in the art.

Furthermore, it should be noted that modifications to the above-described realizations are also within the common knowledge of the person skilled in the art and, thus, also considered as being part of the present disclosure. For instance, the airfoil-shaped aerodynamic device 150 described above may be realized with one, two or more separate airfoil-shaped aerodynamic devices. Similarly, instead of being provided with the single wing-type aerodynamic device 160, two or more wing-type aerodynamic devices may be provided.

Moreover, the shrouded duct 140 described above may at least partly be reduced in its length, i.e., have the reduced or recessed section 1600, or another cut-out which may e.g., be arranged in a bottom part of the shrouded duct 140 between the airfoil-shaped aerodynamic device 150 and the wing-type aerodynamic device 160. In addition, or alternatively, respective leading and trailing edges 143, 141 of the shrouded duct 140 described above may be moveable forward and aft in direction of the roll axis R of FIG. 1.

REFERENCE LIST 100 rotary wing aircraft
101 aircraft nose region
102 aircraft aft region
103 port side wall
104 starboard side wall
105 aircraft upper deck
106 fuselage lower side
110 fuselage 111 cabin
112 fuselage front section
114 fuselage rear section
115 recess area
116 fuselage upper limit
118 upper deck cowling
120 main rotor
122 rotor plane
123 rotor head
124 rotor mast
125, 126, 127, 128, 129 rotor blades
130 tail propeller
132 propeller blades
135 tail propeller disc
139 tail propeller rotation axis
140 shrouded duct
141 shrouded duct trailing edge
142 ring-shaped duct body
143 shrouded duct leading edge
144 hollow interior
145 air duct
150 airfoil-shaped aerodynamic device
160 wing-type aerodynamic device
170 uncovered propeller drive shaft
190 asymmetrical cross-sectional profile of rear section
191, 193, 195, 197 asymmetrical cross-sectional profiles
199 forward flight direction
203, 204 opposite shrouded duct sides
210 bottom line
220 bottom line inclination angle
230 horizontal reference plane
240 aircraft rear door
250 swept back structure
310 width of wing-type aerodynamic device
315 75% length limit
320 smooth transition
330, 340 opposite shrouded duct sides
350 viewing direction
410 source of asymmetry
420 plate-shaped protrusion
510 big diameter cylinder shaft
520, 530 shaft bearings
610 big diameter conical shaft
620, 630 shaft bearings
720 propeller drive shaft rotation direction
730 main rotor downwash
740 sideward force
800 yaw and pitch stability enhancement unit
810 rudder
813 rudder body trailing edge
814 rudder central section
815 elongated rudder body
816 rudder upper axial end
817 rudder body leading edge
818 rudder lower axial end
819 rudder body length axis
820 horizontal strut
823 strut body trailing edge
824 strut central section
825 elongated strut body
826 strut left-hand section
827 strut body leading edge
828 strut right-hand section
829 strut body length axis
830, 840 Fowler-type flaps
832 completely deployed Fowler-type flap
842 completely retracted Fowler-type flap
912 airfoil-shaped profile
914 central airfoil profile
916 upper airfoil profile
918 lower airfoil profile
924, 926, 928 airfoil profile straight centerlines
934, 936, 938 airfoil profile cambered centerlines
1050, 1060 rudder flaps
1310 gap
1410, 1420 separate flap components
1520 flap extension
1600 shrouded duct shortened section
1610, 1620, 1630, 1640 airfoil-shaped aerodynamic devices
1750 shrouded duct leading edge tubercles
1850 rudder or strut leading edge tubercles
1910 undulated shaping out-of-plane
1912, 1914 turning points
1920 rudder body plane
2010 undulated shaping in-plane
2012, 2014, 2016 turning points
2020 rudder body plane
2210 undulated edge
H height axis
P aircraft pitch axis
R aircraft roll axis
Y aircraft yaw axis

What is claimed is:

1. A rotary wing aircraft that extends along an associated roll axis between a nose region and an aft region and that comprises a fuselage with a front section and a rear section, the rotary wing aircraft comprising:
a main rotor that is at least configured to provide lift in hover condition of the rotary wing aircraft,
a propeller that is at least configured to propel the rotary wing aircraft in forward flight condition in a forward flight direction, the propeller comprising a predetermined number of propeller blades which form a circular propeller disc in rotation of the propeller around an associated rotation axis,
a shrouded duct that is arranged in the aft region and that forms an inner air duct which accommodates at least partly the propeller,
wherein the rear section extends between the front section and the shrouded duct and comprises an asymmetrical cross-sectional profile in direction of the associated roll axis, the rear section being configured to generate sideward thrust for main rotor anti-torque from main rotor downwash, and
wherein the shrouded duct comprises a yaw and pitch stability enhancement unit for improving yaw and pitch stability of the rotary wing aircraft in the forward flight condition.

2. The rotary wing aircraft of claim 1,
wherein the yaw and pitch stability enhancement unit comprises a plurality of airfoil-shaped aerodynamic devices arranged in parallel to the associated roll axis and forming a transition from the rear section to a leading edge of the shrouded duct.

3. The rotary wing aircraft of claim 1,
wherein the shrouded duct comprises a leading edge that is provided with a plurality of spaced tubercles.

4. The rotary wing aircraft of claim 1,
wherein the rear section comprises at least one airfoil-shaped aerodynamic device that extends from the front section to the aft region, and wherein the at least one airfoil-shaped aerodynamic device is configured to generate sideward thrust for main rotor anti-torque from main rotor downwash.

5. The rotary wing aircraft of claim 1, wherein the shrouded duct is ring-shaped.

6. The rotary wing aircraft of claim 1, wherein the yaw and pitch stability enhancement unit comprises a rudder rotatably mounted to the shrouded duct.

7. The rotary wing aircraft of claim 1,
wherein the yaw and pitch stability enhancement unit comprises at least one strut that is arranged in the forward flight direction downstream of the circular propeller disc, the at least one strut comprising an elongated strut body that is twisted around a length axis of the elongated strut body.

8. The rotary wing aircraft of claim 7, wherein the elongated strut body comprises a leading edge that is provided with a plurality of spaced tubercles.

9. The rotary wing aircraft of claim 7,
wherein the elongated strut body comprises an airfoil-shaped profile with a straight centerline that is rotated around the length axis of the elongated strut body between both axial ends of the elongated strut body, or with a cambered centerline that comprises a varying camber between both axial ends of the elongated strut body.

10. The rotary wing aircraft of claim 1,
wherein the yaw and pitch stability enhancement unit comprises a rudder that is arranged in the forward flight direction downstream of the circular propeller disc, the rudder comprising an elongated rudder body that is twisted around a length axis of the elongated rudder body.

11. The rotary wing aircraft of claim 10,
wherein the elongated rudder body comprises a leading edge that is provided with a plurality of spaced tubercles.

12. The rotary wing aircraft of claim 10,
wherein the elongated rudder body comprises an airfoil-shaped profile with a straight centerline that is rotated around the length axis of the elongated rudder body between both axial ends of the elongated rudder body, or with a cambered centerline that comprises a varying camber between both axial ends of the elongated rudder body.

13. The rotary wing aircraft of claim 10,
wherein the rudder is rotatably mounted to the shrouded duct, or provided with one or more rotatable flaps.

14. The rotary wing aircraft of claim 1,
wherein the yaw and pitch stability enhancement unit comprises at least one calotte-shaped Fowler-type flap.

15. The rotary wing aircraft of claim 14,
wherein the shrouded duct comprises a ring-shaped duct body, and wherein the at least one calotte-shaped Fowler-type flap is at least partly retractable into the ring-shaped duct body.

16. The rotary wing aircraft of claim 14,
wherein the at least one calotte-shaped Fowler-type flap is arranged on a trailing edge of the shrouded duct.

17. The rotary wing aircraft of claim 16,
wherein the at least one calotte-shaped Fowler-type flap forms, in a neutral position, at least partly the trailing edge of the shrouded duct.

18. A rotary wing aircraft extending along an associated roll axis between a nose and an aft region and that comprises a fuselage with a front and a rear, the rotary wing aircraft comprising:
a main rotor configured to provide lift in hover condition of the rotary wing aircraft,
a propeller configured to propel the rotary wing aircraft in forward flight condition in a forward flight direction, the propeller comprising a plurality of propeller blades forming a circular propeller disc in rotation of the propeller around an associated rotation axis,
a shrouded duct arranged in the aft region and that forms a ring-shaped inner air duct which accommodates at least partly the propeller,
wherein the rear extends between the front and the shrouded duct and comprises an asymmetrical cross-sectional profile along the associated roll axis in the direction of the associated roll axis, the rear being configured to generate sideward thrust for main rotor anti-torque from main rotor downwash, and
wherein the shrouded duct comprises a yaw and pitch stability enhancement unit mounted to the shrouded duct for improving yaw and pitch stability of the rotary wing aircraft in the forward flight condition.

19. A rotary wing aircraft that extends along a roll axis between a nose region and an aft region and comprises a fuselage with a front section and a rear section, the rotary wing aircraft comprising:
a main rotor to provide lift in hover condition of the rotary wing aircraft,
a propeller to propel the rotary wing aircraft in forward flight condition in a forward flight direction, the propeller comprising propeller blades which form a circular propeller disc in rotation of the propeller around one rotation axis,
a closed shrouded duct arranged in the aft region and that forms a closed inner air duct which accommodates at least partly the propeller,
wherein the rear section extends between the front section and the shrouded duct and comprises an asymmetrical cross-sectional profile in direction of the roll axis, the rear section to generate sideward thrust for main rotor anti-torque from main rotor downwash, and
wherein the shrouded duct comprises a yaw and pitch stability enhancement unit for improving yaw and pitch stability of the rotary wing aircraft in the forward flight condition.

20. The rotary wing aircraft of claim 19, wherein the shrouded duct is ring-shaped, the propeller comprises a plurality of propeller blades within the ring-shaped shrouded duct, and the yaw and pitch stability enhancement unit comprises a rudder rotatably mounted to the shrouded duct.

* * * * *